US 11,377,567 B2

(12) United States Patent
Nair et al.

(10) Patent No.: US 11,377,567 B2
(45) Date of Patent: Jul. 5, 2022

(54) AQUEOUS FUNCTIONAL COMPOSITION FOR ARTICLES

(71) Applicant: Eastman Kodak Company, Rochester, NY (US)

(72) Inventors: Mridula Nair, Penfield, NY (US); Stephen Swanton, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 177 days.

(21) Appl. No.: 16/820,855

(22) Filed: Mar. 17, 2020

(65) Prior Publication Data

US 2020/0216684 A1 Jul. 9, 2020

Related U.S. Application Data

(63) Continuation-in-part of application No. 16/203,737, filed on Nov. 29, 2018, now Pat. No. 10,920,032.

(51) Int. Cl.
| | |
|---|---|
| *C09D 5/32* | (2006.01) |
| *C09D 7/61* | (2018.01) |
| *C09D 175/04* | (2006.01) |
| *C09D 7/40* | (2018.01) |
| *C09D 7/43* | (2018.01) |
| *C09D 7/47* | (2018.01) |
| *C08K 7/28* | (2006.01) |
| *C08K 5/00* | (2006.01) |

(52) U.S. Cl.
CPC ............... *C09D 5/32* (2013.01); *C08K 7/28* (2013.01); *C09D 7/43* (2018.01); *C09D 7/47* (2018.01); *C09D 7/61* (2018.01); *C09D 7/70* (2018.01); *C09D 175/04* (2013.01); *C08K 5/0025* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 3,607,341 A | 9/1971 | Goins et al. | |
| 3,713,868 A | 1/1973 | Gordon et al. | |
| 4,137,380 A | 1/1979 | Gunning et al. | |
| 4,439,473 A | 3/1984 | Lippman | |
| 4,457,980 A | 7/1984 | Daniels et al. | |
| 4,677,016 A | 6/1987 | Ferziger et al. | |
| 4,931,356 A * | 6/1990 | Misevich | A43B 3/0084 442/35 |
| 5,741,582 A | 4/1998 | Leaderman et al. | |
| 7,754,409 B2 | 7/2010 | Nair et al. | |
| 7,887,984 B2 | 2/2011 | Nair et al. | |
| 8,252,414 B2 | 8/2012 | Putnam et al. | |
| 8,329,783 B2 | 12/2012 | Nair et al. | |
| 8,617,702 B2 | 12/2013 | Jha et al. | |
| 9,469,738 B1 | 10/2016 | Nair et al. | |
| 9,891,350 B2 | 2/2018 | Lofftus et al. | |
| 9,963,569 B2 | 5/2018 | Nair et al. | |
| 2004/0192835 A1* | 9/2004 | Steidl | C08G 18/44 524/591 |
| 2010/0282358 A1* | 11/2010 | Kano | D03D 1/02 139/384 R |
| 2012/0167666 A1 | 7/2012 | Nair et al. | |
| 2012/0225228 A1* | 9/2012 | Barth | D06N 3/0056 428/35.2 |
| 2015/0093512 A1 | 4/2015 | Brunner et al. | |
| 2015/0234098 A1 | 8/2015 | Lofftus et al. | |
| 2018/0051155 A1 | 2/2018 | Nair et al. | |
| 2018/0327964 A1 | 11/2018 | Nair et al. | |
| 2019/0390027 A1 | 12/2019 | Nair et al. | |
| 2019/0390028 A1 | 12/2019 | Lobo et al. | |
| 2019/0390029 A1 | 12/2019 | Nair et al. | |

FOREIGN PATENT DOCUMENTS

| | | |
|---|---|---|
| CN | 102350841 B | 9/2014 |
| CN | 107605057 A | 1/2018 |
| CN | 107663024 A | 2/2018 |
| EP | 1 380 616 A1 | 1/2004 |
| EP | 3 354 481 A1 | 8/2018 |
| FR | 2496739 B1 | 7/1983 |
| WO | 2013/138158 A1 | 9/2013 |
| WO | 2020/005528 A1 | 1/2020 |

* cited by examiner

*Primary Examiner* — Chinessa T. Golden
(74) *Attorney, Agent, or Firm* — J. Lanny Tucker

(57) ABSTRACT

An aqueous functional composition formulation is used to provide a functional composition in foamed, opacifying elements useful as a light-blocking articles. The aqueous functional composition formulation comprises: (i) glass particles such as hollow glass particles at a coverage of 0.1-2.2 g/cm$^2$ and a (iv) water-soluble or water-dispersible organic polymeric binder that may be crosslinked. Thickeners, coating aids having an HLB of at least 5, (ii) lubricants, (iii) tinting materials, and (v) crosslinking agents can also be present in the aqueous functional composition formulation. Among other properties, the presence of the glass particles provides heat absorption capacity for the foamed, opacifying elements.

18 Claims, No Drawings

AQUEOUS FUNCTIONAL COMPOSITION FOR ARTICLES

This application is a continuation-in-part of U.S. Pat. No. 10,920,032, which is hereby incorporated herein by reference in its entirety.

Reference is also made to the following commonly assigned patent applications and patents:

U.S. Ser. No. 16/820,833 (filed on Mar. 17, 2020 by Nair, Lobo, Garman, and Shifley), and entitled "Method for Making Light-Blocking Articles";

U.S. Pat. No. 10,731,022 by Nair. Lobo, and Donovan;

U.S. Pat. No. 10,696,813 by Lobo, Nair, and Donovan; and

U.S. Pat. No. 10,696,814 by Nair, Lobo, and Donovan;

the disclosures of all of which are incorporated herein by reference.

FIELD OF THE INVENTION

This invention relates to an aqueous functional composition formulation that can be applied to a dry opacifying layer in the preparation of light-blocking articles such as shades, curtains, and other articles used to block ambient light. The resulting functional composition in the article can serve a variety of functions because of the incorporation therein of various materials including hollow glass particles and polymeric binder materials.

BACKGROUND OF THE INVENTION

In general, when light strikes a surface, some of it may be reflected, some absorbed, some scattered, and the rest transmitted. Reflection can be diffuse, such as light reflecting off a rough surface such as a white wall, in all directions, or specular, as in light reflecting off a mirror at a definite angle. An opaque substance transmits almost no light, and therefore reflects, scatters, or absorbs all of it. Both mirrors and carbon black are opaque. Opacity depends on the frequency of the light being considered. "Blackout" or light blocking materials typically refer to coated layers in articles that are substantially impermeable to light such as visible or UV radiation. Thus, when a blackout material such as a blackout curtain or shade is hung over a window, it generally blocks substantially all external light from entering the room through that window. Blackout materials are suitable as curtains and shades for domestic use, for institutional use in hospitals and nursing homes, as well as for use in commercial establishments such as hotels, movie theaters, and aircraft windows where the option of excluding light can be desirable.

Light blocking articles such as the blackout curtains or shades can be comprised of a fabric (porous) substrate coated with more than one layer of a foamed latex composition. There is a desire for these curtains, in addition to blocking transmitted light, to have a light color (hue) facing the environment where an activity needs illumination in order to minimize the amount of artificial lighting needed to perform the activity. An example is when the function of the blackout material is to separate two areas of activity where one or both areas can be artificially lit at the same time. More often than not, the function of a blackout curtain is to prevent sunlight from entering a room through a building window. It can also be desirable for the color (hue) of the side facing the window to match the external décor of the building.

Porous fabrics are derived from yarns of manmade or naturally-occurring threads that are woven or knitted together. Threads used to make yarn are often twisted together to form the threads. Synthetic plastic coating materials, such as polyvinyl chloride, led to the emergence of fabrics woven from plastic coated yarns. Such fabrics have increased durability and wear properties compared to fabrics made from naturally-occurring fibers. One use for such fabrics is window shades especially for commercial and hospital sites.

Light colored blackout curtains theoretically can be made by coating porous fabrics with light colored foams containing light scattering pigments such as titanium dioxide or clays. However, very thick foam coatings will be needed to create blackout curtains through which the sun is not visible in a darkened room using only these pigments. A method that is practiced for reducing the weight of such blackout materials is to sandwich a light-absorbing, foamed black or grey pigment, such as a carbon black layer between two foamed light scattering, white pigment-containing layers.

When an electromagnetic radiation blocking coating has, as it often does, a strongly light absorbing material containing black pigments such as carbon black, between two reflective layers, it has at least two distinct problems. First, such coatings require three or more separate coating operations that reduce manufacturing productivity and increase unit costs. Secondly, carbon black in the light absorbing middle layer can become "fugitive" (or non-enclosed) from some puncture or tear occurring during sewing or laundering, and soil other layers such as the reflective layers, which is highly objectionable. Additionally, the stitches generated in the materials during sewing can cause the fugitive carbon from the light absorbing layer to spread over a larger area thereby increasing the area of objectionable shading of the light-colored surface.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process, wherein the multiple emulsion process provides formation of individual porous particles comprising a continuous polymer phase and multiple discrete internal pores, and such individual porous particles are dispersed in an external aqueous phase. The described Evaporative Limited Coalescence (ELC) process is used to control the particle size and distribution while a hydrocolloid is incorporated to stabilize the inner emulsion of the multiple emulsion that provides the template for generating the pores in the porous particles.

U.S. Pat. No. 9,891,350 (Lofftus et al.) describes improved articles that are designed with an opacifying layer that is capable of blocking predetermined electromagnetic radiation. The opacifying layer is disposed on a substrate that can be composed of any suitable material and an underlying layer can be incorporated between the substrate and the opacifying layer. While these articles have numerous advantages, and represent an important advance in the art, there is a need for further improvement in providing opacifying articles that are lighter in weight; and that have improved flexibility, good "hand," while maintaining light coloration of the surfaces facing an observer without losing reflectivity, and light-absorptive properties; launderability; and minimizing dark opacifying agents getting out into the environment upon stitching and handling.

An improvement in this art is provided by the foamed aqueous compositions described in U.S. Pat. No. 9,469,738 (Nair et al.) in which very small amounts of opacifying colorants incorporated into porous particles can be incorporated into a latex foam, and the resulting composition has a foam density of at least 0.1 g/cm³.

U.S. Pat. No. 9,963,569 (Nair et al) describes a method for providing a foamed, opacifying element includes providing a foamable aqueous latex composition comprising porous particles incorporating within them very small amounts of opacifying colorants, aerating it to a specific foam density, applying the foamed aqueous latex composition to a porous substrate, drying, and densifying the dried layer.

U.S. Pat. No. 4,677,016 (Ferziger) describes a foam-coated, tightly woven fiberglass fabric where at least one surface thereof is coated with one or more layers of a flame retardant foamed latex coating composition. At least one of the foam coating layers is opaque and comprises a cured layer of flame retardant polymeric latex foam.

Co-pending U.S. Ser. Nos. 16/018,332, 16/018,350, and 16/018,367 described above describe opacifying elements having improved properties due to the presence of a functional composition disposed on a dry opacifying layer.

The opacifying layers described in these co-pending applications have a functional layer disposed over an opacifying layer that is coated on one side of a fabric. The primary purposes of the functional layer are to prevent "blocking": i) when a fabric with an opacifying layer is in prolonged physical contact with another opacifying layer deposited on another fabric with each other and to prevent sticking of these layers when they are separated; and ii) when the article of the fabric with the opacifying layer is subjected to the conditions of a thermal dye transfer process and the opacifying layer is under contact with a surface under high temperature and pressure during the transfer process to enable easy separation from the surface.

The properties of the functional layer when a thermal dye transfer process is used are more demanding than those needed for the anti-blocking function. During a thermal dye transfer process, a fabric is kept in contact with the donor element containing a pattern comprising thermal dyes. The opacifying layer with its superimposed functional layer is kept, either, directly in contact with a blanket belt or separated from the belt by an intervening "ghosting" paper that is fabricated with release agents. The entire package can be subjected to a nip at a pressure of about 2-3 psi (0.14-0.21 kg/cm²) and 400° F. (204° C.) temperature for up to 35 seconds, during which the thermal dye(s) sublime from a dye donor(s) into the fabric. At the end of this contact period, both sides of the fabric are expected to release easily and cleanly from the donor element and the blanket belt.

Because the opacifying layer comprises a crosslinked latex binder whose glass transition temperature ($T_g$) is lower than the temperature acquired by the opacifying layer during the thermal dye transfer process, the propensity to stick to the substrate in contact, is high. This necessitates the presence of a functional layer over the opacifying layer. While the spacer particles used in the functional layer described in the noted co-pending patent applications meet the requirements for thermal dye transfer printing, a problem can arise if the spacer particles change the appearance of the article. Polymeric spacer particles are generally opaque and can scatter light and therefore they can make the opacifying layer and functional layer appear lighter in color. While a lighter-colored coating is of itself not a significant problem, any non-uniformity in the functional layer may be more visually noticeable in terms of haze or whiteness in spots, streaks, or patches. Another potential problem with polymer spacer beads known in the art is the challenge to make materials whose glass transition temperature is higher than the operational temperature of 225° C. of a thermal dye transfer printer.

Thus, there is a continued need for improvements in known light-blocking articles to overcome such problems and that improve reflection of thermal energy.

SUMMARY OF THE INVENTION

The present invention provides a functional composition formulation that is an aqueous dispersion having at least 1% solids and up to and including 15% solids, and comprises:

(i) hollow glass particles;

(iv) a water-soluble or water-dispersible organic polymeric binder having a glass transition temperature ($T_g$) below 25° C.;

(v) a crosslinking agent if needed to crosslink the water-soluble or water-dispersible organic polymeric binder;

a thickener; and a coating aid having a hydrophilic-lipophilic balance number of at least 5, wherein the weight ratio of the (i) hollow glass particles to the (iv) water-soluble or water-dispersible organic polymeric binder is at least 10:1 to and including 1:5.

The present invention provides aqueous formulations that can be incorporated into foamed, opacifying elements such as window shades, curtains, and other light-blocking materials that contain low amounts of opacifying colorants in a light-blocking, dry opacifying layer. The foamed, opacifying elements prepared using the present invention have a functional composition disposed over (in some embodiments, directly on) the light-blocking, dry opacifying layer to provide unique surface properties.

It was discovered that the use of glass particles or spheres (such as hollow glass particles) in the functional composition can overcome problems. For example, the glass particles are generally transparent in the visible spectrum of light. The preferred hollow glass particles are light in weight and are also capable of reflecting and scattering radiation, preferentially over solid glass particles. The ability to reflect and scatter incident radiation in the functional composition of the foamed, opacifying elements allows resulting fabric articles to absorb less heat relative to fabric articles that do not contain any glass particles in the noted location.

The functional composition according to the present invention can also mitigate the problem of sticking due to the presence of microscopic protrusions or asperities from the glass particles that help minimize surface contact between the dry opacifying layer and any other solid surface.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the foamed aqueous composition, foamable aqueous composition, functional composition formulations, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered as approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "foamed, opacifying element," "light-blocking element," and "element" are intended to be synonymous terms referring to the same article.

Unless otherwise indicated, the terms "foamed aqueous composition" and "foamed composition" are intended to be synonymous terms and to refer to the same material, and are different from a "functional composition" and "functional composition formulation" as described below.

The terms (a) "porous particle" and (a) "porous particles" are used herein, unless otherwise indicated, to refer to porous organic polymeric materials useful in the foamable aqueous compositions, foamed aqueous compositions, and foamed, opacifying elements. The (a) porous particles generally comprise a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature.

The continuous polymeric phase of the (a) porous particles generally has the same composition throughout that solid phase. That is, the continuous polymeric phase is generally uniform in composition including any materials [for example, (e) opacifying colorant] that can be incorporated therein. In addition, if mixtures of organic polymers are used in the continuous polymeric phase, generally those mixtures also are dispersed uniformly throughout.

As used in this disclosure, the term "isolated from each other" refers to the different (discrete) pores of same or different sizes that are separated from each other by some material of the continuous polymeric phase, and such pores are not interconnected. Thus, "discrete" pores refer to "individual" or "closed," non-connected pores or voids distributed within the continuous polymeric phase.

When used herein, the terms "first discrete pore" and "second discrete pore" refer to distinct sets of individual pores in the (a) porous particles. Each distinct set of pores includes a plurality of discrete pores, each of which discrete pores is isolated from others discrete pores in the distinct set of pores, and the discrete pores of each distinct set of pores are isolated from all other discrete pores of the other distinct sets of pores in the (a) porous particles. Each distinct set of pores can have the same mode average size or both sets can have the same mode average size. For making such (a) porous particles, the word "discrete" can also be used to define different droplets of the first and second aqueous phases when they are suspended in the oil (solvent) phase (described below).

Where there are different sets of discrete pores, the discrete pores of a first set can be predominantly nearer then external particle surface compared to the discrete pores of a second set. For example, a set of smaller discrete pores can be predominantly close to the external particle surface compared to a set of larger discrete pores. As used herein, the term "predominant" means that a larger number fraction of discrete pores of one size is found in a "shell" area nearer the surface of the (a) porous particle than one would expect based on the total number fraction of the two or more types (sizes) of discrete pores present in the (a) porous particle.

The (a) porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the (a) porous particles can include discrete pores of all sizes and shapes (that is, discrete pores entirely within the continuous polymeric phase) providing a suitable volume in each discrete pore, macro discrete pores are particularly useful. While there can be open macro pores on the surface of the porous particle, such open pores are not desirable and are present only by accident. The size of the (a) porous particles, their formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase. If desired, the discrete pores can be grouped predominantly in one part (for example, "core" or "shell") of the (a) porous particles.

The (a) porous particles used in this invention generally have a porosity of at least 20 volume % and up to and including 70 volume %, or likely at least 35 volume % and up to and including 65 volume %, or more typically at least 40 volume % and up to an including 60 volume %, all based on the total porous particle volume. Porosity can be measured by a modification of the known mercury intrusion procedure.

Glass transition temperatures of the organic polymers used to prepare the continuous polymeric phase, or the inorganic or organic spacer particles, can be measured using Differential Scanning calorimetry (DSC) using known procedures. For many commercially available organic materials, the glass transition temperatures are known from the suppliers.

Polymer viscosity (in centipoise or mPa-sec) comprising the continuous polymeric phase can be measured in ethyl acetate at concentration of 20 weight % of the polymer at 25° C. in an Anton Parr MCR 301 stress rheometer in a coquette using steady shear sweeps. Shear rate at 100 sec$^{-1}$ was calculated from the resulting graphical plot of viscosity vs. shear rate.

CIELAB L*, a*, and b* values described herein have the known definitions according to CIE 1976 color space or later known versions of color space and are determined using a standard D65 illuminant and known procedures. These values can be used to express a color as three numerical, L* for the lightness (or brightness) of the color, a* for the green-red component of the color, and b* for the blue-yellow component of the color values.

Delta E (ΔE) is a metric for understanding how the human eye perceives color difference or a measure of change in visual perception of two given colors. Moreover, ΔE is a color difference metric that is intended to correlate with human visual judgments of small differences in perceived color between two color stimuli. ΔE values vary from 0 to 100 where a value of 100 represents colors that are the exact opposite in the CIELAB color space. Delta E 2000 (or ΔE 2000) values are obtained from equations where the weighting of L* is varied depending on where in the lightness range the color falls.

"Openness" (Openness Factor, or OF) refers to how tight the weave is in a fabric material (or other substrate material), or the percentage of holes in a fabric construction, and is sometimes referred to as "weave density." The lower the OF, the less the light transmittance and the greater the visible light that is obstructed or blocked. It is the ratio between transparent and opaque surfaces and depends on the spacing and dimension of the yarn.

Unless otherwise indicated herein, the terms "first opposing surface" and "second opposing surface" refer to the opposing surfaces of the substrate (described below) used to form a foamed, opacifying element according to the present invention. The terms "first outer surface" and "second outer surface" refer to the opposing outer surfaces of a foamed, opacifying element formed according to the present invention.

Uses

The foamable aqueous compositions, foamed aqueous compositions, and functional composition formulations described herein can be used to prepare foamed, opacifying elements that in turn can be useful as radiation ("light") blocking materials or blackout materials for various environments and structures. The foamed, opacifying elements can also exhibit improved sound and heat blocking properties. The foamed, opacifying elements exhibit blackout or light-blocking properties and can optionally have a printable outer surface capable of being embossed or accepting ink used in screen printing, gravure printing, inkjet printing, thermal imaging (such as "dye sublimation thermal transfer"), or other imaging processes. Thus, one can provide embossable or printable surfaces in such foamed, opacifying elements so that the printed image on one outer surface is generally not observable from the other outer surface.

Foamable Aqueous Compositions

The foamable aqueous compositions described herein can be suitably aerated (or "foamed") to provide foamed aqueous compositions, for example to prepare a foamed, opacifying element according to the present invention as described below. In many embodiments, each foamable aqueous compositions used in the present invention have five essential components, that is, only five components are needed to obtain the properties of the dry opacifying layer in a foamed, opacifying element described herein: (a) porous particles as described below; (b) a binder material (that is transformed into (b') matrix material), also described below; (c) one or more additives as described below, for example comprising at least one surfactant; (d) water; and (e) an opacifying colorant that is a different material from all of the additives of component (c). This opacifying colorant is chosen to absorb electromagnetic radiation generally in the UV and visible regions of the electromagnetic spectrum, for example, wavelengths of at least 250 nm and up to and including 800 nm or of at least 350 nm and up to and including 700 nm.

The foamable aqueous composition generally has at least 35% and up to and including 70% solids, or more particularly at least 40% and up to and including 60% solids.

(a) Porous Particles:

Porous particles used in the present invention containing discrete pores (or compartments or voids) are used in the opacifying layers and they are generally prepared using one or more water-in-oil emulsions in combination with an aqueous suspension process, such as in the Evaporative Limited Coalescence (ELC) process that is known in the art. The details for the preparation of the (a) porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the (a) porous particles are generally polymeric and organic in nature (that is, the continuous polymeric phase is polymeric and organic in nature) and non-porous particles (having less than 5% porosity) are excluded from use in the present invention. Inorganic particles can be present on the outer surface as noted below.

The (a) porous particles are composed of a continuous polymeric phase derived from one or more organic polymers that are chosen so that the continuous polymeric phase has a glass transition temperature ($T_g$) of greater than 80° C., or more typically of at least 100° C. and up to and including 180° C., or more likely at least 110° C. and up to and including 170° C. as determined using Differential Scanning calorimetry. Polymers having a $T_g$ that is greater than 200° C. are typically less useful in the continuous polymeric phase.

In addition, the continuous polymeric phase can comprise one or more organic polymers, each of which has a viscosity of at least 80 centipoises (80 mPa-sec) and up to and including 500 centipoises (500 mPa-sec) at a shear rate of 100 sec$^{-1}$ as measured in ethyl acetate at a concentration of 20 weight % at 25° C.

For example, the continuous polymeric phase can comprise one or more organic polymers having the properties noted above, wherein generally at least 70 weight % and up to and including 100 weight % based on the total polymer weight in the continuous polymeric phase, is composed of one or more cellulose polymers (or cellulosic polymers) including but not limited to, those cellulosic polymers derived from one or more (for example, a combination) of cellulose acetate, cellulose butyrate, cellulose acetate butyrate, and cellulose acetate propionate. A polymer derived solely from cellulose acetate butyrate is particularly useful. Mixtures of these cellulose polymers can also be useful if desired, and mixtures comprising a polymer derived from cellulose acetate butyrate as at least 80 weight % of the total of cellulose polymers (or of all polymers in the continuous polymeric phase) are particularly useful mixtures.

In general, the (a) porous particles used in the present invention have a mode particle size equal to or less than 50 μm, or of at least 2 μm and up to and including 50 μm, or typically of at least 3 μm and up to and including 30 μm or even up to and including 40 μm. Most useful (a) porous particles have a mode particle size of at least 3 μm and up to and including 20 μm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

Pore stabilizing materials such as hydrocolloids can be present within at least part of the volume of the discrete pores distributed throughout the continuous polymeric phase, which pore stabilizing materials are described in the Nair, Nair et al., and Putnam et al. patents cited above. In some embodiments, the same pore stabilizing material is incorporated in essentially all the discrete pores throughout the entire (a) porous particles. The pore stabilizing hydrocolloids can be selected from the group consisting of carboxymethyl cellulose (CMC), a gelatin or gelatin derivative, a protein or protein derivative, polyvinyl alcohol and its derivatives, a hydrophilic synthetic polymer, and a water-soluble microgel.

It can be desired in some embodiments to provide additional stability of one or more discrete pores in the (a) porous particles during their formation, by having one or more amphiphilic block copolymers disposed at the interface of the one or more discrete pores and the continuous polymeric phase. Such materials are "low HLB," meaning that they have an HLB (hydrophilic-lipophilic balance) value as it is calculated using known science, of 6 or less, or even 5 or less. The details of these amphiphilic polymers and their use in the preparation of the (a) porous particles are provided in U.S. Pat. No. 9,029,431 (Nair et al.), the disclosure of which is incorporated herein by reference.

A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful.

Such an amphiphilic block copolymer can be generally present in the (a) porous particles in an amount of at least 1 weight % and up to and including 99.5 weight %, or at least 2 weight % and up to and including 50 weight %, based on total porous particle dry weight.

The (a) porous particles used in this invention can be spherical or non-spherical depending upon the desired use. In a method used to prepare the (a) porous particles, additives (shape control agents) can be incorporated into the first or second aqueous phases, or in the oil (organic) phase to modify the shape, aspect ratio, or morphology of the (a) porous particles. The shape control agents can be added prior to or after forming the water-in-oil-in-water emulsion. In either case, the interface at the oil and second water phase is modified before organic solvent is removed, resulting in a reduction in sphericity of the (a) porous particles. The porous particles can also comprise surface stabilizing agents, such as colloidal silica, on the outer surface of each (a) porous particle, in an amount of at least 0.1 weight %, based on the total dry weight of the (a) porous particle.

The average size of the discrete pores in the (a) porous particles is described above.

The (a) porous particles can be provided as powders, or as aqueous suspensions (including water or water with water-miscible organic solvents such as alcohols). Such powders and aqueous suspensions can also include surfactants or suspending agents to keep the porous particles suspended or for rewetting them in an aqueous medium. A useful surfactant for this purpose, for example, is a $C_{12}$-$C_{14}$ secondary alcohol derivative of poly(ethylene oxide) that can be commercially available as TERGITOL® 15-S-7 (Dow Chemical Corporation). The other compositional features are described in the incorporated description of methods for preparing the (a) porous particles.

The (a) porous particles are generally present in the foamable aqueous composition in an amount of at least 0.05 weight % and up to and including 20 weight %, or typically at least 0.5 weight % and up to and including 15 weight %, based on the total weight of the foamable aqueous composition (including all solvents that are present), particularly when the (a) porous particles have a mode size of at least 3 µm and up to and including 20 µm.

Optimal dry opacifying layers designed according to the present invention comprise: (a) porous particles containing a small amount of an (e) opacifying colorant as described below to enhance the light blocking capacity of the (a) porous particles (particularly transmitted light blocking capacity); a (b') matrix material derived from a (b) binder material to hold the (a) porous particles in place; and (c) surfactants and other additives including optionally one or more tinting colorants that can be in other (a) porous particles or dispersed within the layer. The foamed aqueous composition used to prepare the dry opacifying layer comprises foam cells that surround the (a) porous particles.

Upon drying the foamed aqueous composition, the large mismatch in refractive index between the discrete pores of the (a) porous particles in the dry opacifying layer and the polymer walls (continuous polymeric phase), and the dried foam cells, causes incident electromagnetic radiation passing through the dry opacifying layer to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the opacifying layer. If a small amount of (e) opacifying colorant is present in the (a) porous particles of the dry opacifying layer, for example either in the discrete pores or in the continuous polymer phase of the (a) porous particles, the opacifying power of the dry opacifying layer is increased. This is because the multiple scattering of electromagnetic radiation in the dry opacifying layer increases the path length of the electromagnetic radiation through the opacifying layer, thereby increasing the chance that the electromagnetic radiation will encounter the opacifying colorant in the dry opacifying layer and be blocked or absorbed by it.

A single dry opacifying layer can be present in embodiments according to the present invention comprises (a) porous particles and a relatively low amount of an (e) opacifying colorant such as carbon black for creating light-blocking coatings and the dry foam cells surrounded by the (b') matrix material. Multiple light scattering effects by and among the (a) porous particles and the surrounding dry foam cells, increase the path of the electromagnetic radiation through the dry opacifying layer. The likelihood of electromagnetic radiation encountering an (e) opacifying colorant is increased by this greater path length.

(b) Binder Materials:

The foamable and foamed aqueous compositions used in the present also comprises one or more (b) binder materials from which a binding (b') matrix material can be formed to hold the (a) porous particles, (c) additives, and (e) opacifying colorants together in a dry opacifying layer.

It is particularly useful that the (b) binder material have the following properties: it is water-soluble or water-dispersible; it is capable of forming a stable foamed aqueous composition with the essential and optional components described herein; it is capable of being disposed onto a suitable substrate as described below; it does not inhibit the aeration (foaming) process (described below); it is capable of being dried and where desired also crosslinked (or cured); it has good light and heat stability; and it is film-forming but upon curing, it contributes to the flexibility of the foamed, opacifying element and is thus not too brittle, for example having a $T_g$ of less than 25° C. as determined using Differential Scanning Calorimetry.

The choice of (b) binder material can also be used to increase the cleanability of the resulting foamed opacifying compositions in the foamed, opacifying elements. The (b) binder material can be used to provide the (b') matrix material that adds to a supple feel to touch and flexibility especially when disposed on a porous substrate (for example, a fabric) that is meant for window coverings such as draperies.

The (b) binder material can include one or more organic polymers that are film forming and that can be provided as an emulsion, dispersion, or an aqueous solution, and that cumulatively provide the properties noted above. It can also include polymers that are self-crosslinking or self-curable, or it can include one or more polymers to which crosslinking agents are added and are thus curable or capable of being crosslinked (or cured) under appropriate conditions.

Thus, if the (b) binder material is crosslinkable (or curable) in the presence of a suitable crosslinking agent or catalyst, such crosslinking (or curing) can be activated chemically with heat, radiation, or other known means. A curing or crosslinking process serves to provide improved insolubility of the resulting dry foamed composition and well as cohesive strength and adhesion to the porous substrate. The curing or crosslinking agent is generally a chemical having functional groups capable of reacting with reactive sites in a (b) binder material (such as a functionalized latex polymer) under curing conditions to thereby produce a crosslinked structure. Representative crosslinking agents include but are not limited to, multi-functional aziridines, aldehydes, methylol derivatives, and epoxides.

Useful (b) binder materials include but are not limited, to poly(vinyl alcohol), poly(vinyl pyrrolidone), ethylene oxide polymers, polyurethanes, urethane-acrylic copolymers, other acrylic polymers, styrene polymers, styrene-acrylic copolymers, vinyl polymers, vinyl-acrylic polymers, styrene-butadiene copolymers, acrylonitrile copolymers, polyesters, silicone polymers, or a combination of two or more of these organic polymers. Such binder materials are readily available from various commercial sources or can be prepared using known starting materials and synthetic conditions. The binder material can be anionic, cationic or nonionic in net charge. A useful class of film-forming (b) binder materials includes aqueous latex polymer dispersions such as acrylic latexes (including acrylic copolymers) that can be ionic or nonionic colloidal dispersions of acrylate polymers and copolymers. For example, useful film-forming aqueous latexes include but are not limited to, styrene-butadiene latexes, poly(vinyl chloride) and poly(vinylidene chloride) latexes, poly(vinyl pyridine) latexes, poly(acrylonitrile) latexes, poly(vinyl chloride)-acrylic copolymers, and latexes formed from N-methylol acrylamide, butyl acrylate, and ethyl acrylate.

The (b) binder material generally has a glass transition temperature that is less than 25° C., more likely equal to or less than −10° C., or even equal to or less than −25° C. Glass transition temperature for these materials can be determined using known procedures such as Differential Scanning calorimetry as described above. The (b) binder material desirably has adequate flexibility and tensile strength in order to maintain integrity upon handling.

The one or more (b) binder materials can be present in the foamable aqueous composition in an amount of at least 15 weight %, or at least 20 weight % and up to and including 70 weight %, or typically at least 30 weight % and up to and including 50 weight %, based on the total foamable aqueous composition (that is, the total weight of all components including all solvents).

(c) Additives:

The foamable aqueous compositions can include at least 0.0001, or at least 0.001 weight %, or even at least 0.01 weight %, and up to and including 2 weight %, or up to and including 5 weight %, or even up to and including 20 weight %, or even at least and including 30 weight % of one or more (c) additives, or more likely of (c) two or more additives, and typically such (c) two or more additives can comprise at least one foaming agent and at least one foam stabilizing agent as defined below. These amounts refer to the total of all the (c) additives in each foamable aqueous composition and are based on the total weight of those compositions (including water). There can be mixtures of each type of (c) additive, or mixtures of two or more types of (c) additives in each of the foamable aqueous compositions.

Any of these (c) additives or mixtures thereof, can be present within any location of the foamed aqueous composition, including but not limited to the continuous polymeric phase; a volume of the first set (or other set) of discrete pores; or both the first set (or other set) of discrete pores and the continuous polymeric phase of the (a) porous particles. Alternatively, the (c) additives can be present within the (b) binder material alone, or both within the (b) binder material and within the (a) porous particles.

In all embodiments, the (c) additives useful in the present invention are not the same compounds or do not have the same function as the (a) porous particles, (b) binder materials, and (e) opacifying colorants as described herein.

Useful (c) additives include but are not limited to plasticizers, inorganic or organic pigments and dyes (for example, pigment or dye colorants different from the opacifying colorants described below), flame retardants, biocides (such as fungicides and antimicrobial agents), preservatives, pH buffers, optical brighteners, tinting colorants, metal particles such as metal platelets or metal flakes, thickeners, various surfactants, and inert inorganic or organic fillers (such as clays) that are not any of the other materials or opacifying colorants described below.

The "inert" inorganic or organic fillers are particles that can be added to reduce the use of more expensive (b) binder materials. Such fillers do not undergo a chemical reaction in the presence of water or other components in the foamable aqueous composition; nor do they absorb significant electromagnetic radiation like the (e) opacifying colorants. Useful inert organic or inorganic filler materials include but are not limited to titanium dioxide, talc, clay (for example, kaolin), magnesium hydroxides, aluminum hydroxides, dolomite, glass beads, silica, mica, glass fibers, nano-fillers, and calcium carbonate. Combinations of these materials can be used if desired. A clay, talc, calcium carbonate, or a mixture of any of these materials is particularly useful.

One or more plasticizers can be added to soften the "hand" of the final foamed, opacifying element. Useful plasticizers include but are not limited to, alkyl sulfonic acid of phenol sold under the name MESSAMOL® (Lanxess Chemical, Inc.) and bis(2-ethylhexyl) terephthalate sold under the name EASTMAN® 168 (Eastman Chemical Co.).

At least one (c) additive (and more likely at least two different additives) can be a surfactant that is defined as a compound that reduces surface tension. In most embodiments, at least one useful surfactant is a foaming agent (or foaming surfactant) that functions to create and enhance foam formation. In many embodiments, the (c) additives comprise one or more foaming agents (foaming surfactants) as well as one or more foam stabilizing agents that are also surface-active agents that function to structure and stabilize the foam. Examples of useful foaming agents (foaming surfactants) and foam stabilizing agents include but are not limited to, ammonium stearate, sodium lauryl sulfate, ammonium lauryl sulfate, ammonium sulfosuccinate, disodium stearyl sulfosuccinate, diammonium n-octadecyl sulfosuccinamate, ethoxylated alcohols, ionic, nonionic or anionic agents such as fatty acid soaps or a fatty acid condensation product with an alkylene oxide, for example, the condensation product of ethylene oxide with lauryl or oleic acid or an ester of fatty alcohols and similar materials, many of which can be obtained from various commercial sources. Mixtures of foaming agents (or foaming surfactants) and mixtures of foam stabilizers can be used if desired.

The relative amounts of each of these two types of (c) additives is not critical if the desired function is evident, that is suitable foaming properties as required to prepare the foamed aqueous composition, and stability of the foamed aqueous composition during storage and manufacture of the foamed, opacifying elements. The optimal amounts of each of these (c) additives can be determined by using routine experimentation.

Other useful (c) additives include metal particles that can be obtained from any available commercial source as metal flakes or metal platelets and in dry form or as a suspension. Such metal flakes or metal platelets are substantially 2-dimensional particles, having opposing surfaces or faces separated by a relatively minor thickness dimension. The metal flakes can have a size range of at least 2 µm and up to and including 50 µm in main surface equivalent circular diameter (ECD) wherein the ECD is the diameter of a circle having the same area as the main face. Examples of useable metal flakes include those available from Ciba Specialty Chemicals (BASF) such as aluminum flakes that are available as METASHEEN 91-0410 in ethyl acetate, and copper flakes that can be obtained from various commercial sources. Further details of useful metal flakes are provided in Cols. 11-12 of U.S. Pat. No. 8,614,039 (Nair et al.), the disclosure of which is incorporated herein by reference. The metal particles described above, and particularly the metal flakes, can be in the foamable aqueous composition in any suitable location but they are particularly useful when incorporated within the (a) porous particles such as within the volume of the discrete pores of the (a) porous particles.

Useful biocides (that is, antimicrobial agents or antifungal agents) that can be present as (c) additives include but are not limited to, silver metal (for example, silver particles, platelets, or fibrous strands) and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper metal (for example, copper particles, platelets, or fibrous strands) and copper-containing compounds such as copper chelates and copper salts can be present as (c) additives for biocidal purposes. Mixtures of any of silver metal, silver-containing compounds, copper metal, and copper-containing compounds, can also be present and used in this manner.

It can also be useful to include thickeners as (c) additives to modify the viscosity of the foamable aqueous composition and to stabilize it if aeration is not inhibited. A skilled worker can optimize the viscosity to obtain optimal aeration conditions and desired foam density as described below. Useful thickeners can be utilized to control the rheology of the foamable aqueous composition depending upon the method used to form the dry opacifying layer on a substrate as described below. Particularly useful rheology modifiers are RHEOVIS® PU 1214 (BASF), ACRYSOL® G111 (Dow Chemical Company), and Paragum (Royal Adhesives, Inc.).

Useful (c) additives can comprise one or more tinting colorants that can be suitable dyes or pigments (or combinations) and can be used to provide a specific observable color, coloration, or hue in the resulting foamed, opacifying elements. These materials are not chosen to provide the opacifying property described below for the (e) opacifying colorants and thus, tinting colorants are intended to be different materials than the (e) opacifying colorants. Mixtures of tinting colorants can be present in the foamable aqueous compositions and they can be different in composition and amount from each other. The desired coloration or hue can be obtained using specific tinting colorants can be used in combination with (e) opacifying colorant(s) described below to offset or modify the original color of a foamed, opacifying element (without such materials) to provide more whiteness (or brightness or increased L*) in the final "color" (or coloration). The one or more tinting colorants can be incorporated within the (a) porous particles (either within the volume of discrete pores, within the continuous polymeric phase, or in both places), or they can be uniformly dispersed within the (b) binder material. In some embodiments, a tinting colorant can be incorporated within the same (a) porous particles that also include an (e) opacifying colorant (as described below). Alternatively, one or more tinting colorants can be present within both the (a) porous particles (in a suitable location) and within the (b) binder material.

The one or more tinting colorants can be present in the foamable aqueous composition in an amount of at least 0.0001 weight %, or more typically at least 0.001 weight % and up to and including 3 weight %, based on the total weight of the foamable aqueous composition (including all solvents). Tinting colorants can be dyes or organic pigments that are soluble or dispersible in organic solvents and polymers that are used for making the (a) porous particles and thus can be included within the oil phase used to prepare such (a) porous particles. Alternatively, the tinting colorants can be primarily water-soluble or water-dispersible materials that are included into an aqueous phase used to prepare the (a) porous particles or they can be added directly to the foamable aqueous composition.

It can also be useful to include one or more optical brighteners as (c) additives to increase the whiteness (brightness, L*, or "fluorescent" effect) of the final coloration in the foamed, opacifying element. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis (benzoxazole-2-yl); coumarins; carbostyrils; naphthalimides; s-triazines; and pyridotriazoles. Specific examples of optical brighteners can be found in various publications including "Fluorescent Whitening Agents," Kirk-Othmer

*Encyclopedia of Chemical Technology, Fourth Edition*, volume 11, Wiley & Sons, 1994. One of more of such compounds can be present in an amount of at least 0.01 weight % and up to and including 2 weight %, all based on the total weight of the foamable aqueous composition.

When present, one or more optical brighteners can be in one or more locations in the foamed aqueous composition. For example, an optical brightener can be present in the (b) binder material, or within the continuous polymeric phase of the (a) porous particles; a volume of the first set (or any other set) of discrete pores in the (a) porous particles; or both in a volume of the first set (or any other set) of discrete pores and the continuous polymeric phase, of the (a) porous particles.

The (c) additives can comprise two or more materials selected from surfactant that is a foaming agent (foaming surfactant), a foam stabilizing agent, a flame retardant, an antimicrobial agent, and an inorganic filler (such as a clay or titanium dioxide).

(d) Aqueous Medium:

Water is the primary solvent used in an (d) aqueous medium in the foamable aqueous compositions according to the present invention. By "primary" is meant that of the total weight of solvents, water comprises at least 75 weight %, and more likely at least 80 weight % and up to and including 100 weight % of the total solvent weight. Auxiliary solvents that can be present must not adversely affect or harm the other components in the composition, namely the (a) porous particles, (b) binder materials, (c) one or more additives, and (e) opacifying agents. Nor must such auxiliary solvents adversely affect formation of the foamable aqueous composition or its use to prepare a foamed, opacifying element. Such auxiliary solvents can be water-miscible organic solvents such as alcohols and ketones.

The (d) aqueous medium then, which is primarily water, comprises at least 30 weight % and up to and including 65 weight %, or typically at least 40 weight % and up to and including 60 weight %, of the total weight of the foamable aqueous composition.

(e) Opacifying Colorants:

The (e) opacifying colorants used in the present invention can be a single material or chosen from any suitable combination of materials such that the single or multiple materials absorb UV and visible electromagnetic radiation (defined above) to provide blackout properties (or suitable opacity). (e) Opacifying colorants can be soluble dyes or pigments or combinations of each or both types of materials. The (e) opacifying colorants are different compositional and functionally from the compounds defined above as the (c) additives.

In most embodiments, the one or more (e) opacifying colorants are present within a volume of the first set (or another set) of discrete pores within the (a) porous particles, within the continuous polymeric binder of the (a) porous particles, or within both the volume of the first set (or another set) of discrete pores and the continuous polymeric binder of the (a) porous particles. This is highly advantageous as the (a) porous particles can be used to "encapsulate" various (e) opacifying colorants as well as tinting colorants or other (c) additives so they are kept isolated from the other components of the foamable aqueous composition and are additionally not exposed to the environment during sewing or upon surface damage of the foamed, opacifying element. However, in some embodiments, it can be useful to incorporate (e) opacifying colorants solely or additionally within the (b) binder material in which the (a) porous particles are dispersed.

As used herein, an (e) opacifying colorant can include one or more colorant materials that are chosen, individually or in combination, to provide the blocking or absorption of electromagnetic radiation (as described above). While the (e) opacifying colorant(s) can provide some coloration or desired hue, they are not purposely chosen for that purpose and are thus materials that are chosen to be different from the tinting colorants described above.

Examples of (e) opacifying colorants that can be used individually or in combination include but are not limited to, neutral or black pigments or dyes, a carbon black, black iron oxide, graphite, aniline black, anthraquinone black, and combinations of colored pigments or dyes such as combinations of two or more cyan, magenta, green, orange, blue, red, and violet dyes. The present invention is not limited to only the specific opacifying colorants described herein but these are considered as representative and as suitable guidance for a skilled worker to choose other opacifying colorants for the desired purpose. A carbon black, a neutral or black pigment or dye (or combination thereof), or a combination of pigments or dyes other than carbon black, is particularly useful as an opacifying colorant, of which there are many types available from commercial sources. Combinations of dyes or pigments such as a combination of the subtractive primary colored pigments (cyan, magenta, and yellow colored pigments) can also be used to provide a visually neutral (e) opacifying colorant.

The (e) opacifying colorant can be generally present in the foamable aqueous composition in an amount of at least 0.001 weight % and up to and including 0.5 weight %, or even at least 0.003 weight % and up to and including 0.2 weight %, all based on the total weight of the foamable aqueous composition (including the weight of all solvents). These amounts refer to the total amount of one or a mixture of (e) opacifying colorants.

In some embodiments, the (e) opacifying colorant is a carbon black that is present in an amount of at least 0.003 weight % and up to and including 0.2 weight %, based on the total weight of the foamable aqueous composition.

If the (e) opacifying colorants are in pigment form, they can be milled to a fine particle size using appropriate pigment dispersants, and then encapsulated within the volume of the discrete pores of the (a) porous particles by incorporating the milled pigment within an aqueous phase used in making the (a) porous particles. Preparation of milled solid particle dispersions can include combining the (e) opacifying colorant particles to be reduced in size with a dispersant and a liquid medium such as water or ethyl acetate [when the (e) opacifying colorant is incorporated in the continuous polymeric phase] in which the (a) porous particles are to be dispersed, in a suitable grinding mill in which the (a) porous particles are reduced in size and dispersed. The dispersant, an important ingredient in the milling, can be chosen to allow the (e) opacifying colorant particles to be milled in the liquid medium down to a size small enough for incorporation into the discrete pores of the porous particles. The dispersants can be selected to obtain efficient (e) opacifying colorant particle size reduction during milling, provide good colloidal stability of the (e) opacifying colorant particles to prevent agglomeration after milling and impart the desired properties of the final foamed aqueous composition containing the (e) opacifying colorants and the (a) porous particles containing them.

Alternatively, the (e) opacifying colorant can be incorporated within the continuous polymeric phase of the (a) porous particles by incorporating the (e) opacifying colorant in the oil phase used in making the porous particles. Such arrangements can be achieved during the manufacture of the (a) porous particles using the teaching provided herein and in references cited herein.

Foamed Aqueous Compositions

Foamed aqueous compositions can be prepared using the procedures described below wherein an inert gas (such as air) is mechanically incorporated into the foamable aqueous composition as described above, which procedures are designed to provide a foam density of at least 0.1 g/cm$^2$ and up to and including 0.5 g/cm$^3$, or more likely of at least 0.15 g/cm$^3$ and up to and including 0.4 g/cm$^3$. Foam density can be determined gravimetrically by weighing a known volume of the foamed aqueous composition.

The resulting foamed aqueous composition according to this invention generally has at least 35% solids and up to and including 70% solids, or more particularly at least 40% solids and up to and including 60% solids.

Components (a) through (e) of the foamed aqueous composition are generally present in the same relative amounts as described for the foamable aqueous composition (described above) as the foaming process does not appreciably add to or diminish the relative amounts of such components.

For example, the (a) porous particles (as described above) can be present in the foamed aqueous composition in an amount of at least 0.05 weight % and up to and including 15 weight %, or typically of at least 0.5 weight % and up to and including 10 weight %, based on the total weight of the foamed aqueous composition (including all solvents).

One or more (b) binder materials (as described above) can be present in an amount of at least 15 weight %, or at least 20 weight % and up to and including 70 weight % or typically of at least 30 weight % and up to and including 50 weight %, based on the total weight of the foamed aqueous composition (including all solvents).

One or more (c) additives (or two or more different additives, as described above) can be present in an amount of at least 0.0001 weight % and up to and including 30 weight % or typically of at least 0.001 weight %, or even at least 0.01 weight %, and up to and including 20 weight %, based on the total weight of the foamed aqueous composition (including all solvents). At least one of the (c) additives can be a surfactant as described above, and the (c) additives can comprise a foaming agent (foaming surfactant) and a foam stabilizing agent. In some particularly useful embodiments of the foamed aqueous composition, the (c) additives comprise two or more materials selected from surfactant that is a foaming agent (foaming surfactant), a surfactant that is a foam dispersing agent, a flame retardant, an antimicrobial agent, and an inert organic or inorganic filler (such as a clay and titanium dioxide).

Water can also be present as the predominant solvent (at least 75 weight % of total solvent weight), and all the solvents in an (d) aqueous medium can be present in an amount of at least 30 weight % and up to and including 70 weight %, or typically at least 40 weight % and up to and including 60 weight %, based on the total weight of the foamed aqueous composition.

The (e) opacifying colorants (as described above) are generally present in any suitable amount to provide the desired appearance, coloration, and opacity in the resulting foamed, opacifying element, In many embodiments, the one or more (e) opacifying colorants can be present in an amount of at least 0.001 weight % or at least 0.001 weight % and up to and including 0.5 weight %, or even in an amount of least 0.003 weight % and up to and including 0.2 weight %, especially when the (e) opacifying colorant is a carbon black, all weights based on the total weight of the foamed aqueous composition (including all solvents).

For example, an opacifying colorant can be a carbon black and present in an amount of at least 0.003 weight % and up to and including 0.2 weight % based on the total weight of the foamed aqueous composition. Such (e) opacifying colorant can be present in any desirable location as noted above.

Foamed, Opacifying Elements

Foamed, opacifying elements can be prepared using methods described below. Such articles comprise a substrate, a dry opacifying layer formed on the first opposing surface in a manner described below, and a functional composition disposed over (or directly on in some embodiments) the dry opacifying layer, for example as a functional layer, as described below. Each substrate useful herein generally has two opposing sides, for example, a first opposing surface (or side) and a second opposing surface (or side), which opposing surfaces are generally planar in form.

In specific embodiments, the foamed, opacifying elements prepared according to this invention are designed with a single dry opacifying layer as the only foamed layer disposed directly on only one (such as the first) opposing surface of the substrate. In such cases, the single dry opacifying layer and the functional composition disposed thereon are the only essential layers or compositions in the foamed, opacifying element. This simplified structure has numerous advantages over the multi-layer structures known in the art where an opacifying colorant in a foamed layer is generally sandwiched between other foamed layers having various pigments or particulate fillers, such as described for example, in U.S. Pat. No. 4,677,016 (noted above).

However, some less desirable foamed, opacifying elements can be designed with multiple foamed layers including a single dry opacifying layer. A multiple-layer structure can for example, comprise a single dry opacifying layer sandwiched having a foamed non-opacifying layers (having no opacifying colorant as described herein or other pigments).

The dry opacifying layer can be derived from a foamed aqueous composition described above, and comprises components (a) porous particles, (b') matrix material derived from (b) binder material, (c) one or more additives, (d) aqueous medium, and (e) opacifying colorant, all of which are described in more detail above.

Component (a) porous particles that are present in an amount of at least 0.1 weight % and up to and including 35 weight % or at least 0.5 weight % and up to and including 25 weight % are described in detail above, the amounts based on the total weight of the dry opacifying layer. The (a) porous particles can have a mode particle size of at least 2 μm and up to and including 50 μm (or at least 3 μm and up to and including 30 μm, or more likely at least 3 μm and up to and including 20 μm) and a first set of discrete pores of the (a) porous particles can have an average pore size of at least 100 nm and up to and including 7,000 nm.

In addition, the dry opacifying layer includes a (b') matrix material that is derived from a (b) binder material upon curing, which (b') matrix material is generally present in an amount of at least 10 weight % and up to and including 80 weight %, or at least 20 weight % and up to and including 60 weight %, based on the total weight of the dry opacifying layer. Such (b') matrix materials are at least partially cured or crosslinked as described below and can be cured up to 100% of all potential curable or crosslinking sites in the (b) binder material.

One or more (c) additives can be present in an amount of at least 0.0001 weight % and up to and including 50 weight %, or at least 1 weight % and up to and including 45 weight %, such (c) one or more additives being selected from the group consisting of foaming agents, foam stabilizing agents, dispersants, plasticizers, inorganic or organic pigments and dyes (for example, pigment or dye colorants different from the opacifying colorants described below), flame retardants, biocides (including antimicrobials and fungicides), preservatives, pH buffers, surfactants, metal particles such as metal platelets or metal flakes, thickeners, and inert inorganic or organic fillers (such as clays and titanium dioxide) that are not any of the other materials or (e) opacifying colorants described herein, all of which (c) additives are described in more detail above. The amounts are based on the total weight of the opacifying layer. As noted above, embodiments can include at least one surfactant that is a foaming agent and at least one foam stabilizing agent.

Particularly useful (c) additives can comprise one or more materials selected from a foaming agent (foaming surfactant), a foam stabilizing agent, a flame retardant, a biocide (such as an antimicrobial agent), and inert inorganic or organic fillers (such as a clay and titanium dioxide). A useful biocide can comprise silver metal or a silver salt.

The opacifying layer can comprise one or more tinting colorants as (c) additives, for example in the (a) porous particles, in an amount of at least 0.0001 weight % and up to and including 3 weight %, based on the total weight of the opacifying layer.

It is also useful to include one or more optical brighteners as (c) additives in an amount of at least 0.001 weight % and up to and including 0.4 weight %, based on the total weight of the opacifying layer.

Unless otherwise noted, the term "dry opacifying layer" used herein refers to a foamed and densified (and optionally cured) layer substantially in dry form, that contains less than 5 weight %, or even less than 2 weight %, of aqueous medium (including water and any auxiliary solvents), based on the total weight of the dry foamed composition. This amount does not include any water that may be present in the discrete pores of the (a) porous particles. The dry opacifying layer generally comprises at least 90% solids, or at least 95% or 98% solids.

The dry opacifying layer can also contain at least 0.002 weight %, or even at least 0.02 weight % and up to and including 2 weight % or up to and including 1 weight %, of one or more (e) opacifying colorants (as described above), based on the total weight of the dry opacifying layer. Such (e) opacifying colorants can be present in locations described above. As noted above, the (e) opacifying colorants are different in composition and function from all other materials in the dry opacifying layer. The possible locations of the (e) opacifying colorant are described above.

For example, a carbon black can be present as the (e) opacifying colorant in an amount of at least 0.002 weight % and up to and including 1 weight %, based on the total weight of the dry opacifying layer.

Substrates useful in the practice of the present invention can comprise various porous or non-porous materials including but not limited to woven and nonwoven textile fabrics composed of nylon, polyester, cotton, aramide, rayon, polyolefin, acrylic wool, porous glasses, fiberglass fabrics, or felt or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethylpentene, polyether ketone, (meth)acrylonitrile], porous paper or other porous cellulosic materials, canvases, porous wood, porous plaster and other porous materials that would be apparent to one skilled in the art. The substrates can vary in dry thickness and in many embodiments, the substrate thickness is at least 50 μm.

Some useful substrates comprise a porous fabric comprising a plurality (at least two) continuous yarn strands woven or knitted together. As used herein, the "yarn" comprises continuous strands (at least two) of a material, which strands are twisted or woven together to form a "thread." Each yarn strand can comprise a multifilament core that is encased in a coating comprising a thermoplastic polymer.

The multifilament core can comprise multiple (at least two) filaments composed of naturally-occurring fibers or polymers, or of synthetic polymers selected from the group consisting of an aramid, a polypropylene, a polyethylene, an acrylic resin, nylon, and a polyester. Alternatively, the multifilament core can comprise fiberglass as multiple filaments. Each of the multiple filaments can be composed of the same material or a mixture of such materials. Alternatively, the multiple filaments can be homogenous, but filaments composed of different materials can be used in the same multifilament core.

The multifilament core can be designed to have any desirable size and in general, it has an average diameter of at least 75 denier and up to and including 2500 denier, wherein a denier refers to 1.2 g/9000 meters of a filament.

Each filament of the multifilament core can further comprise a flame retardant, examples of which would be readily apparent to one skilled in the art. A multifilament core can be prepared using known technology, for example as described in U.S. Patent Application Publication 2007/0015426 (Ahmed et al.), the disclosure of which is incorporated herein by reference.

The coating applied to the multifilament core can comprise one or more thermoplastic polymers, including but not limited to a polyester elastomer, a polypropylene, a polyethylene, an ethylene octane copolymer, a substituted or unsubstituted vinyl chloride polymer (including homopolymer and copolymers derived in part from vinyl chloride), polyvinylidene fluoride, ethylene vinyl acetate, a thermoplastic polyurethane, poly(tetrafluoroethylene) (PTFE), a silicone resin, and various hot melt adhesives. Various grades or combinations of these materials can be used if desired. The term "thermoplastic" refers to a polymeric material or resin that changes properties when heated and cooled.

Substrates useful in this invention generally have an openness (or Openness Factor) of 0% and up to and including 10%, or at least 1% and up to and including 10%, or of at least 5% and up to and including 10%.

The substrates can be surface treated before application of the aqueous foamed composition by various processes including corona discharge, glow discharge, UV or ozone exposure, flame, or solvent washing in order to promote desired adhesion and other physical properties.

Functional Composition Formulations

A functional composition according to this invention is intended to provide the foamed, opacifying elements with one or more functional properties in the functional composition as described below. A functional composition can comprise (i) glass particles (described below) as the sole essential component. However, in some embodiments containing the (i) glass particles and a (ii) lubricant (described below) can be also present. In still other embodiments, a (ii) lubricant and a (iii) tinting material (described below) can be present together with the (i) glass particles. In still other embodiments, (i) glass particles can be combined with a (iii) tinting material, but a (ii) lubricant is not present.

Before application, each functional composition formulation according to the present invention can comprise an aqueous dispersion of the desired components including the (i) glass particles. For example, in some particularly useful embodiments, the functional composition formulation, depending on its function, can comprise: (i) glass particles such as hollow glass particles as defined below; (ii) a lubricant; (iii) a tinting material; a (iv) water-soluble or water-dispersible organic polymeric binder; a (v) crosslinking agent for the (iv) water-soluble or water-dispersible organic polymeric binder (if crosslinkable); a thickener; and a coating aid (wetting surfactant) such as those having a hydrophilic-lipophilic balance number of at least 5, all mixed together in water to form a stable aqueous dispersion.

As described in more detail below, a functional composition formulation can be applied in a suitable manner to provide a functional composition disposed over (for example, directly on) the dry opacifying layer in a uniform continuous manner to form a functional layer that essentially covers all of the substrate surface. In other embodiments, the functional composition can be arranged or disposed on the dry opacifying layer in a discontinuous manner in small or large regions on the substrate surface, for example by spraying, to form a regular or irregular pattern. In many embodiments, the functional composition can be disposed directly on the opacifying layer in a uniform or patternwise manner so that there are no intermediate materials or layers between the dry opacifying layer and the functional composition.

In some embodiments, the functional composition formulation can be foamed similarly to foaming of the foamable aqueous composition described below before it is disposed over (or directly on) the dry opacifying layer. The resulting applied functional composition is then also foamed.

The functional composition formulation generally has a % solids of at least 0.5% and up to and including 10% with water being the predominant (more than 50 weight % of all solvents) solvent.

The functional composition can be present in a foamed, opacifying element at a dry coverage of at least 0.5 g/m$^2$ and up to and including 15 g/m$^2$ or of at least 1 g/m$^2$ and up to and including 10 g/m$^2$.

The functional composition derived from the functional composition formulation according to this invention can provide one or more functions simultaneously. For example, it can provide one or more of: a "release" function where the coefficient of friction between the opacifying layer and any other solid surface is reduced allowing easy separation of the contacting surfaces; an anti-blocking function where microscopic protrusions or asperities help to minimize surface adherence between the dry opacifying layer and any other solid surface by increasing the distance between the two contacting surfaces, thereby minimizing blocking; antimicrobial function (with one or more antimicrobial agents present); tactile function where the functional composition enhances the tactile experience (or "feel") of the opacifying layer; antistatic function to reduce static charge; and a soil resistance function to reduce potential soiling. These functional properties can be provided by one or more described components (i), (ii), (iii), (iv), and (v) in the functional composition, and some components can provide multiple functions.

Useful (i) glass particles generally have an average particle size of at least 5 μm, or at least 20 μm and up to and including 100 μm, or up to and including 60 μm, or even at least 20 μm and up to and including 40 μm. Average particle size can be determined by using known procedures and equipment to measure the largest diameter of a plurality of (i) glass particles and determining an arithmetic average.

Useful (i) glass particles can be made from different chemical types of glasses. This includes soda-lime borosilicate, alkali-free or fused silica, among other specialized glasses. Such materials can be obtained from various commercial sources or prepared using known procedures and starting materials. While solid glass particles can be used in some embodiments, it is desirable that the (i) glass particles are "hollow" glass particles having a single void volume surrounded by a "shell" of glass. Such hollow glass particles typically do not contain multiple voids or "pores" within the particle volume. Examples of useful commercial materials of this nature include soda-lime-borosilicate hollow glass spheres from 3M that are available as a series of products for different applications, for example, the S series, K series, iM series, XLD series, and HGS series. Of these the iM16K hollow glass particles are particularly desirable.

The (i) glass particles can have a density of at least 0.1 g/cm$^3$ and up to and including 2.2 g/cm$^3$ depending upon whether they are hollow glass particles or solid glass particles. For example, useful solid glass particles can have a density of up to 2.2 g/cm$^3$, while useful hollow glass particles can have a density of at least 0.1 g/cm$^3$ and up to and including 0.7 g/cm$^3$.

The (i) glass particles can be present in the functional composition in the foamed, opacifying element in an amount of at least 10 weight % and up to and including 99 weight %, or more likely of at least 25 weight % and up to and including 80 weight %, based on the total weight of the functional composition. The corresponding amounts of the (i) glass particles (for example, hollow glass particles) in the functional composition formulation can be determined as at least 0.25 weight % and up to and including 20 weight %, or at least 0.5 weight % and up to and including 10 weight %, all based on the total weight of the functional composition formulation.

In some embodiments, the functional composition formulation contains (i) hollow glass particles having an average particle size of at least 10 μm and up to and including 60 μm, which are present in an amount of at least 0.25 weight % and up to and including 20 weight %, based on the total weight of the functional composition formulation.

Optionally, a (ii) solid or non-solid lubricant can be present in the functional composition. Each solid lubricant generally has a crystallinity of at least 50% and melt very little at temperatures below 40° C. Its wax melt viscosity can be at least 5 centipoise (5 mPa-sec), or at least 10 centipoise (10 mPa-sec) and up to and including 100 centipoise (100 mPa-sec). Mixtures of the same or different types of materials can be used if desired. For example, such solid (ii) lubricants can be selected from one or more components of the group consisting of nonliquid waxes, metal esters of fatty acids such as calcium soaps, graphite, silicone-based polymers, and fluoropolymers, or a combination of any of the same or different types of these materials. The (ii) lubricants are different compositionally from the (i) hollow glass particles described above.

Useful nonliquid waxes include but are not limited to, polyolefins such as polyethylene wax and polypropylene wax as well as long chain hydrocarbon waxes such paraffin wax. Other useful nonliquid waxes include carbonyl group-containing waxes such as long-chain aliphatic ester waxes; polyalkanoic acid ester waxes such as montan wax, trimethylolpropane tribehenate, and glycerin tribehenate; polyalkanol ester waxes such as tristearyl trimellitate, and distearyl maleate; and polyalkanoic acid amide waxes such as trimellitic acid tristearyl amide. Examples of useful aliphatic amides and aliphatic acids include oleamide, eucamide, stearamide, behenamide, ethylene bi)oleamide), ethylene bis (stearamide), ethylene bis(behenamide), and long chain acids include but are not limited to, stearic, lauric, montanic, behenic, oleic, and tall oil acids. U.S. Patent Application Publication 2010/0021838 (Putnam et al.) describes some representative nonliquid waxes in [0054], the disclosure of which is incorporated herein by reference. Useful materials of this type can be obtained from various commercial sources.

Useful metal esters of fatty acids include but are not limited to, compounds of metals complexed with fatty acids that are derived from vegetable oils or animal tallow, such as sodium, potassium, calcium, magnesium and aluminum soaps, wherein the fatty acids comprise at least 12 and up to and including 20 carbon atoms and are generally saturated or mono-unsaturated in nature. Representative compounds of this type, such as calcium stearate, can be obtained from various commercial sources.

Graphite can be provided in various forms and obtained from commercial sources.

A useful fluoropolymer is polytetrafluoroethylene (PTFE or Teflon) but other polymers comprising at least some fluorinated moieties can also be used if they have lubricating properties.

Non-solid lubricants are also useful including but not limited to, silicone-based polymers such as polydimethylsiloxanes having a molecular weight less than 10,000.

A (ii) lubricant described herein can be present in the functional composition at a dry coverage of at least 0.01 g/m$^2$ and up to and including 30 g/m$^2$ or at least 1 g/m$^2$ and up to and including 20 g/m$^2$. The amount of such materials in the functional composition formulation to supply these "dry" coverages would be readily determined by a skilled worker.

Moreover, (iii) tinting materials can be present in the functional composition and can be one or more pigments, one or more dyes, or any combination thereof. For example, the (iii) tinting material can be used to provide a $\Delta$E 2000 value of at least 3.5, and more likely of at least 4 relative to the same foamed, opacifying element from which the functional composition has been omitted (not applied). By "same," it is meant that all components and structures of the two foamed, opacifying element are identical as best they can be made so, but one foamed, opacifying element contains a functional composition and the other does not.

In some embodiments, one or more white pigments as (iii) tinting materials can be present to provide a "whiter" appearance in the foamed, opacifying element, that is providing an L* value greater than 70 (or even greater than 80). Useful white pigments useful for this purpose include but are not limited to titanium dioxide, barium sulfate, calcium carbonate, and combinations of two or more of such materials.

Other useful (iii) tinting materials can comprise cyan, magenta, yellow, red, green, or blue pigments, or combinations two or more thereof, that reflect or scatter in a region of the visible electromagnetic spectrum to produce the desired coloration or hue. Moreover, white pigments can be combined with one or more of the cyan, magenta, yellow, red, green, or blue pigments. Other useful pigments suitable for use as (iii) tinting materials include, but are not limited to, titanium dioxide, titanium coated mica, barium sulfate, calcium carbonate, zinc oxide, azo pigments, monoazo pigments, di-azo pigments, azo pigment lakes, Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigment. Other examples of useful tinting materials are described in [0052] of U.S. Patent Application Publication 2010/0021838 (noted above).

In all embodiments, the (iii) tinting material is not the same material as the (i) hollow glass particles or the (ii) lubricant. The (iii) tinting material, however, can be the same as or different from the tinting colorants present as (c) additives in the opacifying layer.

Such (iii) tinting material can be present in the functional composition at a dry coverage of at least 0.01 g/m$^2$ and up to and including 45 g/m$^2$ or at least 5 g/m$^2$ or up to and including 25 g/m$^2$. The actual amount of tinting material added depends on the strength or covering power of the chosen colorant(s). The amount of a (iii) tinting material in the functional composition formulation would be readily determined by a skilled worker to provide these "dry" coverages.

The functional composition can also comprise one or more (iv) water-soluble or water-dispersible organic polymeric binders, each of which generally has T$_g$ below 25° C. (determined as described above) in which the (i) hollow glass particles and other components are dispersed. The (iv) water-soluble or water-dispersible organic polymeric binder can be film-forming, that is, it can form a film once applied and dried. Such materials can be self-crosslinkable or crosslinkable using a suitable (v) crosslinking agent as described below. Useful (iv) water-soluble or water-dispersible organic polymeric binders include but are not limited to, film forming polymers such as a partially hydrolyzed polyvinyl acetate, poly(vinyl alcohol), poly(vinyl pyrrolidone), cellulosic polymers (such as carboxymethyl cellulose and hydroxymethyl cellulose), a polysaccharide, a poly(ethylene oxide), acrylamide polymers, polyester ionomers, gelatin or gelatin derivatives, gellan, starches, polyethylene imine, polyvinyl amine, and derivatives of these materials, fluorinated polymers such as fluorinated polyurethanes, polymers containing siloxane moieties, polyurethanes, urethane-acrylic copolymers, other acrylic polymers derived at least in part from one or more acrylic esters or methacrylic esters, styrene-acrylic copolymers, vinyl polymers, polyesters, or a combination of two or more of same or different types of these organic polymer binders. Such (iv) organic polymeric binders are readily available from various commercial sources or prepared using known starting materials and synthetic conditions. For example, a useful fluorinated polyurethane is available as 3M® Stain Resistant Additive SRC-220 from 3M Company. Yet another useful material is a self-crosslinking copolymer derived from n-butyl acrylate, ethyl acrylate, and N-methylol acrylamide having a glass transition temperature (T$_g$) that is less than −5° C. The (iv) water-soluble or water-dispersible organic polymeric binder can be useful in the functional composition for adhering the (i) hollow glass particles and other noted components to the outer surface of the dry opacifying layer and, to provide an enhanced level of abrasion resistance and cohesiveness.

The (iv) water-soluble or water-dispersible organic polymeric binder can be present in the functional composition in an amount of at least 1 weight % and up to and including 90 weight %, or typically at least 5 weight % and up to and including 75 weight %, based on the total functional composition weight. Such materials can be present in the functional composition formulation in an amount of at least 0.05 weight % and up to and including 5 weight %, or of at least 0.1 weight % and up to and including 2 weight %, based on the total weight of the functional composition formulation. It is also possible to have a weight ratio of (i) glass particles to the (iv) water-soluble or water-dispersible organic polymeric binder of from 10:1 to and including 1:5, or of from 8:1 to and including 1:3.

It may be beneficial to chemically crosslink some (iv) water-soluble or water-dispersible organic polymeric binders that are crosslinkable to improve functional composition cohesiveness by including a (v) crosslinking agent. Such (iv) water-soluble or water-dispersible organic polymeric binders can be at least partially curable or crosslinkable and can be cured up to and including 100% of all potential curable or crosslinking sites. The identity and amount of a suitable (v) crosslinking agent will depend on the choice of (iv) water-soluble or water-dispersible organic polymeric binder and its reactivity with the (v) crosslinking agent, the number of crosslinking sites available, compatibility with other functional composition components, and manufacturing constraints such as functional composition formulation pot life, application means, and drying speed. Non-exclusive examples of (v) crosslinking agents include glyoxal, CARTABOND® TSI (Clariant), CARTABOND® EPI (Clariant), SEQUAREZ™ 755 (Omnova), glutaraldehyde sodium bisulfate complex (Aldrich), Sunrez 700M (Om nova), Sunrez 700C (Omnova), CR-5L (Esprix), bis(vinyl) sulfone, bis(vinyl) sulfone methyl ether, adipoyl dihydrazide, epichlorohydrin polyamide resins, and urea-formaldehyde resins. In one embodiment, a crosslinked (iv) water-soluble or water-dispersible organic polymeric binder includes a hydrolyzed polyvinyl acetate polymer that has been crosslinked using an (v) epichlorohydrin polyamide resin compound. The amount of suitable (v) crosslinking agent in the functional composition formulation would be readily apparent to one skilled in the art.

It is also desirable in many embodiments, for the (i) glass particles in the functional composition to be hollow glass particles. and the weight ratio of such (i) hollow glass particles to the (iv) water-soluble or water-dispersible organic polymeric binder that is present, is at least 10:1 to and including 1:5.

The functional composition can be prepared from application of a functional composition formulation that can also include one or more coating aids (or wetting surfactants) to aid in the coating or deposition of the functional composition formulation. If a layer of a functional composition is desired to cover essentially all of the substrate surface using a known coating procedure, any coating aid (or wetting surfactant) that will lower the surface tension of the functional composition formulation sufficiently to prevent edge-withdrawal, repellencies, and other coating defects can be used. For example, useful coating aids (or wetting surfactants) include but are not limited to, alkyloxy- or alkylphenoxypolyethers and polyglycidol derivatives and their sulfates, such as nonylphenoxypoly(glycidol) that are available from Olin Matheson Corporation; sodium octylphenoxypoly (ethyleneoxide) sulfate; organic sulfates and sulfonates, such as sodium dodecyl sulfate, sodium dodecyl sulfonate, sodium bis(2-ethylhexyl)sulfosuccinate (Aerosol OT); and alkyl carboxylate salts such as sodium decanoate.

If the functional composition formulation is to be disposed on the dry opacifying layer by spraying, coating aids (or wetting surfactants known in the art as spreading agents that are capable of reducing the surface tension substantially to aid in the formation of small drops) can be present. Examples of such coating aids are trisiloxanes like SILWET® L-77 and L-7608, and acetylenic diols such as SURFYNOL® 104 and SURFYNOL® 104A. Useful coating aids (wetting surfactants) generally have a hydrophilic-lipophilic balance (HLB) number of at least 5, or more likely of at least 7. HLB is a known parameter used to define the hydrophilic and lipophilic properties and components of surface active agents and can be determined using known methods and apparatus.

Useful coating aids of this type can be present in the functional composition formulation in an amount of at least 0.01 weight % and up to and including 5 weight %, based on the total weight of the functional composition formulation.

Useful thickeners that can be present singly or in combinations in the functional composition formulation are generally non-associative thickeners, and examples of which are alginin, guar gum, locust bean gum, xanthan gum, acrylic polymers that are alkali swellable, agar, carboxymethyl cellulose, pectin or carrageenan. Such thickeners can be present in the functional composition formulation in an amount of at least 0.001 weight % and up to and including 10 weight %, based on the total weight of the functional composition formulation.

The functional composition can include one or more of other optional additives that provide various properties or characteristics. For example, the functional composition formulation can include a biocide or antimicrobial agent of which there are numerous materials known in the art for this purpose (including silver metal and silver salts); antistatic agents known in the art to dissipate electrical charge and static; tactile modifiers that change the "feel" of outer surface of the foamed, opacifying element; visual modifiers that provide a matte, opalescent or other such desirable look; and soil resistance agents that reduce the potential for soiling from handling or spills. Combinations of the same or different type of material can be present.

For some embodiments, the functional composition formulation is an aqueous dispersion (containing water as the predominant solvent) comprising: (i) hollow glass particles; a (ii) lubricant; a (iii) tinting material; a (iv) water-soluble or water-dispersible organic polymeric binder; a (v) crosslinking agent for the (iv) water-soluble or water-dispersible organic polymeric binder (if crosslinkable); a thickener; and a coating aid (or surfactant described above) having a hydrophilic-lipophilic balance number of at least 5.

Method of Providing Functional Compositions and Foamed, Opacifying Elements

The foamed, opacifying elements described herein can be prepared using essential functions A) through F) described below, and generally in the listed order.

Firstly, the method is carried out by A) providing a substrate having a first opposing side (or surface) and a second opposing side (or surface). Useful substrate materials are described above.

A foamable aqueous composition as described above consisting essentially of components (a) through (e) in the described amounts and having at least 35% solids and up to and including 70% solids, is foamed in a suitable manner to provide a foamed aqueous composition. A foamable aqueous composition can be aerated to provide a foamed aqueous composition having a foam density of at least 0.1 g/cm$^3$ and up to and including 0.5 g/cm$^3$, or of at least 0.15 g/cm$^3$ and up to and including 0.4 g/cm$^3$, or even of at least 0.15 g/cm$^3$ and up to and including 0.27 g/cm$^3$. This aeration procedure can be carried out using suitable conditions and equipment that would be readily apparent to one skilled in the art in order to create a "foam," for example in the presence of a foaming agent that is present as at least one of the (c) one or more additives described above. For example, aeration can be carried out by mechanically introducing air or an inert gas (such as nitrogen or argon) in a controlled manner. High shear mechanical aeration can be carried out using sonication or high-speed mixers, such as those equipped with a cowles blade, or with commercially available rotorstator mixers with interdigitated pins such as an Oakes mixer or a Hobart mixer, by introducing air under pressure or by drawing atmospheric air into the foamable aqueous composition with the whipping action of the mixer. Suitable foaming equipment can be used in a manner to provide the desired foam density with modest experimentation. It can be useful to chill or cool the foamable aqueous composition below ambient temperature to increase stability by increasing composition viscosity, and to prevent its collapse. This chilling operation can be carried out immediately before, immediately after, or during the aeration procedure. Stability of the foamed aqueous composition can also be enhanced by the presence of a foam stabilizing agent as another of the (c) one or more additives.

Once the foamed aqueous composition has been formed, it can be B) disposed or applied to the first opposing side of a suitable substrate (described above), such as a porous woven substrate. This procedure can be carried out in any suitable manner that does not undesirably diminish the foam density (or foam structure) of the foamed aqueous composition. For example, the substrate first opposing surface can be coated with the aqueous foamed composition using any suitable known coating equipment (floating knife, hopper, blade, or gap) and coating procedures including but not limited to, blade coating, gap coating such as "knife-over-roll" and "knife over table" operation, floating knife, slot die coating, or slide hopper coating, especially if multiple layers are applied to the substrate in the same operation. Useful layer forming (coating) means are described, for example, in U.S. Pat. No. 4,677,016 (noted above), the disclosure of which is incorporated herein by reference for such coating details.

In many embodiments, the foamed aqueous composition can be disposed directly onto the first opposing surface of the substrate ("directly" means there are no intervening or intermediate layers).

The amount of foamed aqueous composition to be applied should be sufficient to provide a dry coverage of less than or equal to 10 ounces (mass)/yard$^2$ (or less than or equal to 339.08 g/m$^2$), or at a dry coverage of at least 1.5 ounces (mass)/yard$^2$ (or 50.86 g/m$^2$) and up to and including 7 ounces (mass)/yard$^2$ (237.35 g/m$^2$).

Once the foamed aqueous composition has been formed on the first opposing surface of the substrate, it can be C) dried to provide a dry opacifying layer, wherein "dry" is defined in relation to the amount of (d) aqueous medium that is present, as described above for the dry foamed aqueous composition or dry opacifying layer. There may be some partial and unintentional curing of the (b) binder material at this point to form some (b') matrix material, but it is generally not desirable for substantial curing to take place during the C) drying. Drying can be accomplished by any suitable means such as by heating with warm or hot air, microwaves, or IR irradiation at a temperature and time sufficient for drying (for example, at less than 160° C.) to provide a dry opacifying layer.

After drying, the dry opacifying layer on the substrate can be D) densified or crushed on the substrate to reduce the foamed layer thickness. Thus, the C) drying and D) densifying operations can be carried out sequentially without much delay between the two features. A densified or crushed dry opacifying layer is formed using this combination of functions.

D) Densifying or crushing is a process of subjecting the dry opacifying layer to mechanical pressure, to densify the foam cells and to reduce overall layer thickness. This process can be carried out in any suitable manner, but it is generally carried out by a process that provides pressure to the dry opacifying layer, for example, by passing it while on the substrate through a compression calendering operation, pressing operation, or embossing operation, or a combination thereof. For example, the dry opacifying layer on the substrate can be pressed between flat plates or through nip rollers under pressure, or it can be passed through a combination of calendering and embossing rollers to reduce the thickness of the dry opacifying layer and to densify the foam cells. The original thickness of the dry opacifying layer can be reduced by at least 20% (by volume) during such an operation. This process can be considered a "densifying operation" as the dry opacifying layer is made denser while it is pressed together. The thickness of the dry opacifying layer before and after densifying can be determined by a known technique such as laser profilometry.

The D) densifying process can be carried out at any suitable temperature including room temperature (for example, 20-25° C.) and up to and including 90° C., or more likely at a temperature of at least 20° C. and up to and including 80° C. The D) densifying process is carried out at nip pressures that are suitable for the construction of the substrate including the openness factor to prevent over crushing and consequent loss of uniform opacity of the dry opacifying layer. A useful crushing pressure can be determined using routine experimentation depending upon several factors including the foamed aqueous composition formulation and type of substrate used. For example, a useful densifying pressure can be at least 15 psi (103.4 kPa) and up to and including 200 psi (1379 kPa).

Once D) densifying is completed, a suitable functional composition formulation according to this invention, can be applied in the E) feature in a suitable manner to the dry opacifying layer. For example, the applying step E) can be carried out immediately after the D) densifying step without intermediate steps.

At some time after the D) densifying operation, the method according to this invention comprises E) applying or disposing a functional composition formulation to the dry opacifying layer, which functional composition formulation comprises the (i) glass particles described above. In many embodiments, the functional composition formulation is disposed directly on the dry opacifying layer so there are no intermediate layers of compositions.

The functional composition formulation can be disposed on the dry opacifying layer using any number of suitable application techniques such as uniformly or non-uniformly spraying, wrapped wire rod coating, rotary screen coating, air knife coating, screen printing, gravure coating or flexographic printing (or other offset coating techniques), reversed roll coating, slot coating, gap coating, blade coating, extrusion hopper coating, roll coating, slide coating, curtain coating, pad coating, and other techniques that would be readily apparent to one skilled in the art. For example, application of the functional composition formulation can be carried out using an engraved flexible or non-flexible roller in an "anilox coating system" where the functional composition formulation, usually of controlled viscosity, is deposited on the flexible or non-flexible roller. A doctor blade is used to meter excess fluid from the surface leaving just the measured amount of fluid in the engraved cells. The anilox roll then rotates to contact the outer surface of the dry opacifying layer that receives the functional composition formulation from the cells.

It is also particularly desirable to apply the functional composition formulation in a non-contact manner onto the dry opacifying layer such as using any suitable spray apparatus and system, especially when the functional composition formulation comprises one or more coating aids. There are several methods for spraying fluids onto surfaces that are known in the art and that can be used in the practice of this invention. These include compressed air spraying that converts the drops of the functional composition formulation into a mist; electrostatic spray systems where application of electric field at the nozzle controls the drop size and the electric field between the drop of functional composition formulation and the surface controls its deposition; ultrasonic spray systems where the ultrasonic energy can be used to create a mist of uniform drop size of the functional composition formulation; and rotary spray that uses centrifugal force to atomize the functional composition formulation. The most common spray technology uses fluid pressure and nozzle design to create functional composition formulation drops of a desired size. In addition to controlling drop size, nozzle designs also include the geometry of an ensemble of drops exiting the nozzle. Such geometries include for example, a cone, a fan (trapezoidal), or a jet. The choice of the geometry is selected based on the application method and, depends upon the orientation between the spray nozzle and the substrate and whether the spray system is mobile and the surface is stationary or vice versa or a combination of the two.

A desirable method of applying the functional composition formulation according to the present invention is to use a stationary spray system with a moving surface. In this instance, the desired geometry of the ensemble of functional composition formulation drops exiting a nozzle is a that of a fan with the article containing the dry opacifying layer moving perpendicular to the plane of the fan. When the surface width is larger than the width of the fan, multiple nozzles can be employed and spaced apart such that the overlapping sprays from adjacent nozzles creates a uniform coverage of drops across the width of the surface. In addition to using hydraulic pressure to disperse the drops, other mechanical forces such as nozzle pulsation, ultrasound, centrifugal force, or air currents, or a combination of two or three of these means, can be used to aid uniform distribution of the functional composition formulation onto the surface. Another aspect of controlling the uniformity of depositing the functional composition formulation is to control its properties, specifically its viscosity and surface tension, properties well known to those of ordinary skill in the art. For example, for achieving desirable small drops, the viscosity and surface tension at the shear rates experienced at the nozzle should be as low as possible. Shearing thinning fluids are preferred such that the viscosity at the nozzle shear rates is as low as possible. In such embodiments, the functional composition formulation comprises a suitable coating aid (wetting surfactant), such as any low molecular weight surfactant, that can lower the dynamic surface tension of the functional composition formulation and provide the lowest surface tension. Useful surfactants for this purpose are based on silicones such as for example, organo-modified trisiloxanes as well as other described above.

A uniformly distributed coating can be formed over (or directly on) the dry opacifying layer, or discontinuous applications can be made to provide regular or irregular patterns by spraying or other application techniques. When disposed in a discontinuous manner, the functional composition can be present as isolated discontinuous patterns or coalesced to form a uniform deposition on to the dry opacifying layer.

The applied functional composition formulation can be dried by simple evaporation of water and any other solvents, to form the functional composition on the dry opacifying layer. This drying can be accelerated by known techniques such as convection heating including forced air or infrared heating, or other means that would be apparent to one skilled in the art. The drying can also be carried out or continued in the F) curing operation described as follows.

F) Curing the applied functional composition formulation and the dry opacifying layer can then be carried out under suitable conditions known to one skilled in the art, for example to convert most or all of the b) binder materials to form (b') matrix materials. For example, curing (and drying) can be accomplished using heat or infrared radiation or other conditions to which the (b) binder materials and catalysts in the dry opacifying layer, and the (iv) water-soluble or water-dispersible organic polymeric binder(s) and (v) cross-linking agents, are responsive to achieve crosslinking. In some embodiments, a suitable functionalized self-crosslinking latex composition can be used as the (b) binder material, as the (iv) water-soluble or water-dispersible organic polymeric binder, or both. During this operation, a curing or crosslinking reaction can occur between reactive side groups of suitable curable polymer chains.

The resulting foamed, opacifying element can exhibit a bending stiffness (or "bending force") as determined using the L&W Stiffness Test (described below) of at least 0.15 milliNewtons meter (mN-m).

Further details of coating and drying techniques are described in further detail in Research Disclosure No. 308119, December 1989, pages 1007-1008 and in references cited therein. Curing of the applied functional composition can also be carried out during or subsequently to F) curing at temperatures for example, from 100-160° C.

The dry opacifying layer can be embossed after the C) drying step and before the F) curing step using the procedure and equipment described below.

Alternatively, after the F) curing operation, it is possible to provide an embossed design on an outer surface of the foamed, opacifying element, for example by patterned embossing or calendering the outer surface, to create selected regions of high or low opacity and thickness. The resulting embossed design can be viewed from either side in transmission.

It is further possible to form images on either outer surface of the foamed, opacifying element, with or without a primer, using any suitable printing means such as inkjet printing, screen printing, or flexographic printing, thereby forming printed images of text, pictures, symbols, or combinations thereof. Such printed images can be visible, or they can invisible to the unaided eye (for example, using fluorescent dyes in the printed images). Alternatively, the outer surface can be covered by suitable means with a colorless layer to provide a desired protective finish. In many instances, the image formed in this manner, for example, on one outer surface, is not visible or discernible from the other outer surface.

A thermally printed image can be formed on either outer surface, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches (containing appropriate one or more dye sublimation thermal transfer colorants) with or without a thermal colorless (clear) patch. Useful details of such a process are provided in U.S. Pat. No. 10,145,061 (Nair et al.), the disclosure of which is incorporated herein by reference.

Thus, dye sublimation thermal transfer printing is a method to impart a desired color or color pattern or image to an outer surface of a synthetic fabric substrate such as polyester, nylon and acrylic materials. Dye sublimation thermal transfer printing utilizes thermally responsive inks containing sublimable dyes or colorants that, under the influence of heat sublime or vaporize onto the outer surface of the fabric, penetrate the fibers, and become entrained therein or attached to the textile fiber. Dye sublimation thermal transfer printing processes and materials used therein are known and are described in numerous publications, for example, in U.S. Pat. No. 3,363,557 (Blake), U.S. Pat. No. 3,952,131 (Sideman), U.S. Pat. No. 4,139,343 (Steiner), U.S. Pat. No. 6,036,808 (Shaw-Klein et al.), U.S. Pat. No. 8,628,185 (Hale et al.), U.S. Pat. No. 9,315,682 (Delys et al.), U.S. Pat. No. 4,117,699 (Renaut), U.S. Pat. No. 4,097,230 (Sandhu), U.S. Pat. No. 4,576,610 (Donenfeld), U.S. Pat. No. 5,668,081 (Simpson et al.), and U.S. Pat. No. 7,153,626 (Foster et al.), the disclosures of all of which are incorporated herein by reference.

The following Examples are provided to illustrate the practice of this invention and are not meant to be limiting in any manner. The following materials were used in the Examples.

Materials used in the Following Examples:

The continuous polymeric phase polymers used in the following examples were the EASTMAN™ Cellulose Acetate Butyrate 381-0.5 (CAB), a cellulose ester, $T_g$ of 130° C. (obtained from Chem Point).

COATOSIL™ 77 is nonionic organo-modified trisiloxane surfactant (coating aid) that was obtained from Momentive Performance Materials.

NALCO® 1060 containing colloidal silica was obtained from Nalco Chemical Company as a 50 weight % aqueous dispersion.

The poly(methylamino ethanol adipate) (AMAE co-stabilizer) was prepared using known procedures and starting materials.

Carboxy methylcellulose (CMC, 250,000 kDa) was obtained from Ashland Aqualon as AQUALON™ 9M31F.

The amphiphilic block copolymer of polyethylene oxide and polycaprolactone (PEO-b-PCL) 5K-20K, was prepared using the procedure described in U.S. Pat. No. 5,429,826 (Nair et al., the disclosure of which is incorporated herein by reference) where the first number is the molecular weight of the hydrophilic block segment, PEO, and the second number is the molecular weight of the oleophilic block segment, PCL.

TERGITOL® 15-S-7, a C12-C14 secondary alcohol surfactant having an HLB value of 12.4, was obtained from the Dow Chemical Corporation.

The optical brightener TINOPAL® OB CO was obtained from BASF Corporation.

Styrene-co-divinyl benzene copolymer ("SD matte"), 6 μm matte beads, were made in-house using known suitable ethylenically unsaturated polymerizable monomers and a known polymerization procedure.

The carbon black (K) was used as an (e) opacifying colorant in the form of an aqueous dispersion available as Black Pearls 880 obtained from Cabot Corporation.

DISPERSBYK® 022, a silicone based defoamer, was obtained from BYK-Chemie USA.

SOLSPERSE® 43000, a polyacrylate polymeric dispersant, was obtained from Lubrizol Corp.

Xanthan gum was obtained under the tradename Kelzan (manufactured by Kelco Inc.).

Hollow glass particles were obtained from 3M Corporation under the tradename iM16K. They had an average particle size of 20 μm and a density of 0.46.

A clay powder was obtained from the THIELE KAOLIN COMPANY® under the tradename SKT-13 and had an average particle size of 0.6 μm.

Polyamide particles were obtained from Arkema, Inc. as ORGASOL® 2001 EXD Nat 1, an average particle size of 10 μm and a melting point of 177° C.

Polyamide particles were obtained from Arkema Inc. as ORGASOL® 1002 es5 Nat 1 that have an average particle of size of 50 μm and a melting point of 213° C.

The porous fabric substrates used in the Examples below were composed of a polyester, having a weight of about 80-110 g/m².

The foamable aqueous composition (CF drapery compound) was made from a formulation comprising a self-crosslinking copolymer (P1) derived from n-butyl acrylate, ethyl acrylate, and N-methylol acrylamide using a known procedure, and having a glass transition temperature ($T_g$) of approximately −25° C. as the (b) binder material from which the (b') matrix material was derived, (c) additives titanium dioxide, clay filler, a flame retardant, and foaming surfactant and foam stabilizing agent. This copolymer P1 was also used as the (iv) water-soluble or water-dispersible organic polymeric binder in the functional composition formulations.

Preparation of Pigment Dispersions for Porous Particles:

The opacifying pigment dispersion was prepared by combining dry pigment, a dispersant as described in TABLE I below, and an aqueous medium in a suitable milling vessel. The particle size of the pigment was reduced by milling it using ceramic media until all pigment particles were reduced below a diameter of 1 μm as determined by optical microscopy.

TABLE I

Colorant Dispersions

| Dispersion | Pigment | Dispersant (weight % of Pigment) | Pigment Weight % |
|---|---|---|---|
| D-K ("black") | K | SOLSPERSE® 43000 (5) DISPERSBYK® 022 (0.05) | 25 |

Preparation of (a) Porous Particles PP:

The (a) porous particles PP used for preparing a foamed, opacifying element contained 1 weight % of optical brightener (identified below) in the continuous CAB polymeric phase and 0.8 weight % opacifying colorant (K) in the discrete pores.

An aqueous phase was made up by dissolving 5 grams of CMC in 240.5 grams of distilled water and adding to it 4.3 grams of the D-K dispersion containing 18.6 weight % of carbon black. This aqueous phase was dispersed in 831.8 grams of an oil phase containing 97.7 grams of CAB, 2 grams of PEO-b-PCL, and 1 gram of the optical brightener, TINOPAL® OB CO in ethyl acetate, using a homogenizer. A 975-gram aliquot of the resulting water-in-oil emulsion was dispersed using the Silverson L4R homogenizer for two minutes at 1200 RPM, in 1625 grams of a 200 mmolar pH 4 acetate buffer containing 39 grams of NALCO® 1060 colloidal silica, and 9.75 grams of AMAE co-stabilizer followed by homogenization in an orifice homogenizer at 1000 psi (70.4 kg$_f$/cm$^2$) to form a water-in-oil-in-water double emulsion. The ethyl acetate was removed under reduced pressure at 40° C. after dilution of the water-in-oil-in-water emulsion with an equal weight of water. The resulting suspension of solidified porous particles PP was filtered, and the isolated porous particles PP were washed with water several times, followed by rinsing with a 0.05 weight % solution of TERGITOL® 15-S-7 surfactant. The isolated porous particles PP were then air dried. They had a mode particle size of 5.4 μm and a porosity of 46 volume %. Typically, the discrete pores contained within the porous particles PP prepared according to this procedure had an average diameter of from 150 nm and up to and including 1,500 nm. The moisture content of the final powder was 56%.

Preparation of Foamable Aqueous Compositions; Foamed Aqueous Compositions; and Foamed, Opacifying Element A1:

A foamable aqueous composition containing porous particles PP was prepared by combining 191 grams of porous particles PP with 1209 grams of CF drapery compound. Porous particles PP were dispersed into the mixture by stirring at 1200 rev/minute using a 50-mm diameter Cowles blade at ambient temperature for 30-60 minutes. The resulting foamable aqueous composition was used to prepare a foamed aqueous composition under pressure using an Oakes 2M Laboratory Mixer Model 2MBT1A. Each resulting foamed aqueous composition, having a foam density of from 0.18 g/cm$^3$ to 0.25 g/cm$^3$, was coated onto a ("first opposing") surface of the porous substrate described above using a coating knife, dried at a temperature of from 85° C. to 145° C. until the moisture content was less than 2 weight %, and crushed ("densified") on the porous substrate between hard rollers under pressure. The dried and crushed opacifying composition was further cured at 160° C. for 2 minutes to crosslink the (b) binder material and form the resulting (b') matrix material. The resulting foamed, opacifying element A1 was used to create element samples using a functional composition according to the present invention. This foamed, opacifying element exhibited an optical density (OD) of 5.4 for the dry opacifying layer weight of 168 g/m$^2$.

Preparation and Use of Functional Composition Formulations:

Xanthan gum (thickener) was stirred into water until it was hydrated. After about 2 hours, it was stirred again into a homogeneous suspension. The organic polymeric binder P1 (50 weight %) was added to this suspension. COATOSIL™ 77 (wetting surfactant or coating aid) was then added with gentle stirring, followed by addition of the hollow glass particles. The resulting organic polymeric binder P1 amount level was at 1 weight %, the xanthan gum was at 0.5 weight % of the solution, and the COATOSIL 77 was at 0.2 weight %, all based on the total weight in the suspension. The hollow glass particles were added to different samples of the suspension at varying levels as described in TABLE II below.

The substrate used for the experiments was a woven polyester fabric of a dry weight of 2.8 oz/yd$^2$ (7.38 g/m$^2$) and having a foamed opacifying layer on a surface at a dry coverage of 5.46 oz/yd$^2$ (14.39 g/m$^2$).

An atomizing paint sprayer activated with air at 40 psi (2.81 kg$_f$/cm$^2$) was used to spray the functional composition formulations onto the side of the fabric coated with the opacifying layer. The amount deposited on a fabric substrate was determined by measuring the change in weight of a known area of the fabric substrate before and after spraying. Sprayed samples of foamed, opacifying elements were dried in a convection oven first at 135° C. and then at 160° C. to cure and crosslink the materials in the resulting functional composition.

Release Testing:

A buck press is a clam-shell press that mimics the temperature and pressure in the nip of a thermal dye transfer process (sublimation) printer. It has one side that can be heated and a second side that is not heated. Both surfaces are padded with a thermally conductive layer and the two surfaces can be pressed together under a controlled pressure. This apparatus was used to thermally print images onto to the samples of foamed, opacifying elements described above. Each element was sandwiched between a thermal dye donor element and a release paper (obtained from PROTEX, of 19 g/m$^2$ weight) with the thermal dye donor in contact with the polyester fabric substrate, and the release paper was in direct contact with the functional composition of each foamed, opacifying element. The combination (packet) comprising the thermal dye donor, foamed, opacifying element, and the release paper was placed within the buck press where the heated side of the buck press was in contact with thermal dye donor and the un-heated side was in contact with the release paper. A pressure of 2 psi (0.141 kg$_f$/cm$^2$) and temperature of 204° C. were maintained for 32 seconds for each experiment. After this thermal dye transfer process was carried out, the release paper was peeled off the functional composition. The ease of peeling was rated from 1 through 5 where the 1 is the value for the easiest release and 5 was the value where the release paper was completed stuck to the back side of the polyester fabric substrate.

The following TABLE II shows the various functional compositions used in the experiments and the release testing and appearance evaluations.

TABLE II

| Release Additive | Release Additive Weight % | Dry Laydown (g/m²) | Wt. % release additive in topcoat | Release Rating of 1 (best) to 5 (worst) | Release Testing Comments | Appearance of spray coating |
|---|---|---|---|---|---|---|
| Control: no functional composition present | | | | 5 | Release paper stuck to opacifying layer | |
| Clay SK-T 13 | 15 | 6.394 | 90% | 3 | Release paper needed to be peeled off; did not fall off | Hazy white; not very uniform |
| ORGANSOL® 2001 EXD NAT 1 | 6 | 4.359 | 78% | 4 | Some sticking of release paper but easier to remove than for the Control | Hazy white; not very uniform |
| 3M Glass Bubbles iM16K | 3 | 1.918 | 64% | 1 | No sticking of release paper; slid off | Uniform |
| 3M Glass Bubbles iM16K | 5 | 3.526 | 75% | 1 | No sticking of release paper; slid off | Uniform |
| 3M Glass Bubbles iM16K | 7 | 3.925 | 80% | 1 | No sticking of release paper; slid off | Uniform |
| None | 0 | 0.620 | 0% | 3 | Stuck to release paper but it was easier to peel than for the Control | Uniform |
| 3M Glass Bubbles iM16K | 0.5 | 1.066 | 23% | 2 | No Sticking of release paper | Uniform |
| 3M Glass Bubbles iM16K | 1 | 1.235 | 37% | 1.5 | No Sticking of release paper | Uniform |
| SD matte | 5 | 3.623 | 75% | 1.5 | Very slight sticking of release paper | Some mottle |
| ORGANSOL® 1002 ES5 NAT 1 | 2 | 1.922 | 54% | 1.5 | Very slight sticking of release paper | Some mottle |
| ORGASOL® 1002 ES5 NAT 1 | 5 | 4.431 | 75% | 1 | No sticking of release paper | Some mottling |
| ORGASOL® 1002 ES5 NAT 1 | 7 | 5.521 | 80% | 1 | No sticking of release paper | Whitish color with mottle and non-uniformity |

The data in TABLE II provide information about the advantages of the present invention. The foamed, opacifying elements having a functional composition containing the hollow glass particles exhibited easy release from the release paper. However, those elements in which the functional composition did not contain hollow glass particles exhibited difficult release from the release paper.

Moreover, the appearance of the functional compositions used in the present invention were very uniform in appearance and differed very little in appearance from the foamed, opacifying elements from which a functional composition had been omitted.

The presence of clay particles in a functional composition required a relatively high amount because of its particle size, and it was relatively effective but not as effective as the hollow glass particles beads even at a coverage of 10 times higher. More importantly, the appearance of the functional composition containing clay particles was hazy and non-uniform, which makes such compositions difficult manufacture predictably.

The lower melting point of the nylon particles made them ineffective as a release agent in the functional composition, because they did not survive the heat of the buck press. As a result, there was some sticking of the release paper to the element. The higher melting point nylon particles did provide good release properties, but the appearance of the functional composition was white and nonuniform.

The SD matte particles were not effective as release agents in the functional composition and caused a mottled appearance.

The invention has been described in detail with particular reference to certain preferred embodiments thereof, but it will be understood that variations and modifications can be obtained within the spirit and scope of the invention.

The invention claimed is:

1. A functional composition formulation that is an aqueous dispersion having at least 1% solids and up to and including 15% solids, and comprises:
 (i) hollow glass particles;
 (iv) a water-soluble or water-dispersible organic polymeric binder having a glass transition temperature ($T_g$) below 25° C.;
 (v) a crosslinking agent if it is needed to crosslink the water-soluble or water-dispersible organic polymeric binder;
 a thickener selected from alginin, guar gum, locust bean gum, xanthan gum, acrylic polymers that are alkali swellable, agar, carboxymethyl cellulose, pectin, and carrageenan;
 a coating aid having a hydrophilic-lipophilic balance number of at least 5 and selected from the group consisting of alkyloxy- or alkylphenoxypolyethers and polyglycidol derivatives and their sulfates; sodium octylphenoxypoly(ethyleneoxide) sulfate; organic sulfates and sulfonates; alkyl carboxylate salts, and a combination of two or more of these materials, and water present in an amount of more than 50 weight % of all solvents present, wherein the weight ratio of the (i) hollow glass particles to the (iv) water-soluble or water-dispersible organic polymeric binder is at least 10:1 to and including 1:5.

2. The functional composition formulation of claim 1, further comprising one or both of a (ii) lubricant and a (iii) tinting material.

3. The functional composition formulation of claim 2, wherein the (ii) lubricant is a nonliquid wax, a metal ester of a fatty acid, graphite, a silicone-based polymer, a fluoropolymer, or a combination of two or more of these materials.

4. The functional composition formulation of claim 1, wherein the (i) hollow glass particles are present in an amount of at least 0.25 weight % and up to and including 20 weight %, based on the total weight of the functional composition formulation.

5. The functional composition formulation of claim 1, wherein the (i) hollow glass particles have an average particle size of at least 5 μm and up to and including 100 μm.

6. The functional composition formulation of claim 1, wherein the (i) hollow glass particles have an average particle size of at least 20 μm and up to and including 60 μm and are present in an amount of at least 0.5 weight % and up to and including 10 weight %, based on the total weight of the functional composition formulation.

7. The functional composition formulation of claim 1, wherein the (i) hollow glass particles have an average particle size of at least 20 μm and up to and including 40 μm.

8. The functional composition formulation of claim 1, wherein the (i) hollow glass particles have a density at least 0.1 g/cc and up to and including 0.7 g/cc.

9. The functional composition formulation of claim 1, wherein the (iv) water-soluble or water-dispersible organic polymeric binder is a poly(vinyl alcohol), a partially hydrolyzed polyvinyl acetate, a cellulosic polymer, a poly(ethylene oxide), a poly(vinyl pyrrolidone), an acrylic polymer, an acrylamide polymer, a fluorinated polymer, a polymer containing siloxane moieties, gelatin or a gelatin derivative, gellan, a polysaccharide, a polyurethane, a polyester ionomer, or a combination of two or more of these materials.

10. The functional composition formulation of claim 9, wherein the (iv) water-soluble or water-dispersible organic polymeric binder is a fluorinated polyurethane.

11. The functional composition formulation of claim 1, having a % solids of at least 0.5% and up to and including 10%.

12. The functional composition formulation of claim 1, wherein the weight ratio of the (i) hollow glass particles to the (iv) organic polymeric binder is at least 8:1 to and including 1:3.

13. The functional composition formulation of claim 1, wherein the coating aid is present in an amount of at least 0.01 weight % and up to and including 5 weight %, based on the total weight of the functional composition formulation.

14. The functional composition formulation of claim 1, wherein the coating aid has a hydrophilic-lipophilic balance number of at least 7.

15. An aqueous dispersion having at least 1% solids and up to and including 15% solids, and comprises:
(i) hollow glass particles having an average particle size of at least 20 μm and up to and including 40 μm, which hollow glass particles are present in an amount of at least 0.5 weight % and up to and 10 weight %;
(iv) a water-soluble or water-dispersible organic polymeric binder having a glass transition temperature ($T_g$) below 25° C., and that is selected from the group consisting of poly(vinyl alcohol), a partially hydrolyzed polyvinyl acetate, a cellulosic polymer, a poly (ethylene oxide), a poly(vinyl pyrrolidone), an acrylic polymer, an acrylamide polymer, a fluorinated polymer, and a combination of two or more of these materials;
(v) a crosslinking agent if it is needed to crosslink the water-soluble or water-dispersible organic polymeric binder,
a thickener selected from the group consisting of alginin, guar gum, locust bean gum, xanthan gum, acrylic polymers that are alkali swellable, agar, carboxymethyl cellulose, pectin, carrageenan, and a combination of two or more of these materials, which thickener is present in an amount of at least 0.001 weight % and up to and including 10 weight %; and
a coating aid having a hydrophilic-lipophilic balance number of at least 5 and selected from the group consisting of alkyloxy- or alkylphenoxypolyethers and polyglycidol derivatives and their sulfates; sodium octylphenoxypoly(ethyleneoxide) sulfate; organic sulfates and sulfonates; alkyl carboxylate salts, and a combination of two or more of these materials, and which coating aid is present in an amount of at least 0.01 weight % and up to and including 5 weight %,
wherein the weight ratio of the (i) hollow glass particles to the (iv) water-soluble or water-dispersible organic polymeric binder is at least 10:1 to and including 1:5, and all amounts are based on the total weight of the aqueous dispersion.

16. The aqueous dispersion of claim 15, wherein the (iv) a water-soluble or water-dispersible organic polymeric binder is copolymer derived from n-butyl acrylate, ethyl acrylate, and N-methylol acrylamide, or it is a fluorinated polyurethane, or it is a combination of both the copolymer and the fluorinated polyurethane.

17. The aqueous dispersion of claim 15, wherein the thickener is xanthan gum.

18. An aqueous dispersion having at least 1% solids and up to and including 15% solids, and comprises:
(i) hollow glass particles having an average particle size of at least 20 μm and up to and including 40 μm, which hollow glass particles are present in an amount of at least 0.5 weight % and up to and 10 weight %;
(iv) a water-soluble or water-dispersible organic polymeric binder having a glass transition temperature ($T_g$) below 25° C., and that is selected from the group consisting of poly(vinyl alcohol), a partially hydrolyzed polyvinyl acetate, a cellulosic polymer, a poly (ethylene oxide), a poly(vinyl pyrrolidone), an acrylic polymer, an acrylamide polymer, a fluorinated polymer, and a combination of two or more of these materials;
(v) a crosslinking agent if it is needed to crosslink the water-soluble or water-dispersible organic polymeric binder;
a thickener selected from the group consisting of alginin, guar gum, locust bean gum, xanthan gum, acrylic polymers that are alkali swellable, agar, carboxymethyl cellulose, pectin, carrageenan, and a combination of two or more of these materials, which thickener is present in an amount of at least 0.001 weight % and up to and including 10 weight %; and
a coating aid having a hydrophilic-lipophilic balance number of at least 5 and that is a nonionic organomodified trisiloxane surfactant, and which coating aid is present in an amount of at least 0.01 weight % and up to and including 5 weight %,
wherein the weight ratio of the (i) hollow glass particles to the (iv) water-soluble or water-dispersible organic polymeric binder is at least 10:1 to and including 1:5, and all amounts are based on the total weight of the aqueous dispersion.

\* \* \* \* \*